(12) United States Patent
Guan

(10) Patent No.: US 11,128,611 B2
(45) Date of Patent: *Sep. 21, 2021

(54) METHOD FOR DETERMINING PATH COMPUTATION ELEMENT AND COMMUNICATIONS DEVICE

(71) Applicant: Huawei Technologies Co., Ltd., Shenzhen (CN)

(72) Inventor: Hongguang Guan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 137 days.

This patent is subject to a terminal disclaimer.

(21) Appl. No.: 16/154,297

(22) Filed: Oct. 8, 2018

(65) Prior Publication Data

US 2019/0044934 A1 Feb. 7, 2019

Related U.S. Application Data

(63) Continuation of application No. 15/134,115, filed on Apr. 20, 2016, now Pat. No. 10,110,581, which is a (Continued)

(30) Foreign Application Priority Data

Oct. 21, 2013 (CN) .......................... 201310496882.0

(51) Int. Cl.
*H04L 29/06* (2006.01)
*H04L 12/717* (2013.01)
*H04L 12/733* (2013.01)

(52) U.S. Cl.
CPC .............. *H04L 63/08* (2013.01); *H04L 45/42* (2013.01); *H04L 63/166* (2013.01); *H04L 63/20* (2013.01); *H04L 45/126* (2013.01)

(58) Field of Classification Search
CPC ....... H04L 63/08; H04L 63/166; H04L 63/20; H04L 45/42
See application file for complete search history.

(56) References Cited

U.S. PATENT DOCUMENTS

2006/0098657 A1 5/2006 Vasseur et al.
2006/0198308 A1* 9/2006 Vasseur ................ H04L 67/104
370/238
(Continued)

FOREIGN PATENT DOCUMENTS

| CN | 101335692 A | 12/2008 |
|---|---|---|
| CN | 101573997 A | 11/2009 |
| EP | 2009848 A1 | 12/2008 |

OTHER PUBLICATIONS

Le Roux et al. "IS-IS Protocol Extensions for Path Computation Element (PCE) Discovery," Network Working Group, Request for Comments: 5089, (Jan. 2008).

(Continued)

*Primary Examiner* — Jeffrey C Pwu
*Assistant Examiner* — Thong P Truong
(74) *Attorney, Agent, or Firm* — Leydig, Voit & Mayer, Ltd.

(57) ABSTRACT

A method for determining a path computation element and a communications device are provided, where location information and transmission capability information of a PCE are carried in a route advertisement message and are advertised to a PCC, so that the PCC can select, according to the transmission capability information of the PCE in the route advertisement message, a PCE that meets a transmission capability of the PCC, to perform path computation; therefore, a problem that a transmission capability mismatch between the PCC and the PCE causes a failure in establishing a PCEP session is avoided.

20 Claims, 9 Drawing Sheets

Related U.S. Application Data continuation of application No. PCT/CN2014/088445, filed on Oct. 13, 2014.

(56) References Cited

U.S. PATENT DOCUMENTS

2009/0217347 A1* 8/2009 Chen .................. H04L 45/42
                                                    726/1
2010/0061301 A1   3/2010 Antal et al.

OTHER PUBLICATIONS

Vasseur et al., "Path Computation Element (PCE) Communication Protocol (PCEP)," Network Working Group, Request for Comments: 5440, IETF Trust, (Mar. 2009).
Lopez et al. "Secure Transport for PCEP draft-lopez-pcp-pceps-00," Path Computation Element, Internet-Draft, Intended status: standards track, IETF Trust (Jul. 10, 2013).
Le Roux et al. "OSPF Protocol Extensions for Path Computation Element (PCE) Discovery," Network Working Group, Request for Comments: 5088, Category: Standards Track, (Jan. 2008).
Wu et al, "Path Computation Element (PCE) Discovery using Domain Name System(DNS); draft-wu-pce-dns-pce-discovery-03. txt," PCE Working Group, Internet Draft, DNS based PCED, XP015095182, pp. 1-23, Internet Engineering Task Force, Fremont, CA (Oct. 11, 2013).
U.S. Appl. No. 15/134,115, filed Apr. 20, 2016.

* cited by examiner

A communications device generates an IGP route advertisement message, where the IGP route advertisement message includes location information and transmission capability information of a first PCE, and the transmission capability information of the first PCE includes a first flag bit, a second flag bit, and a third flag bit, where the first flag bit is used to indicate whether the first PCE supports a TCP MD5 option, the second flag bit is used to indicate whether the first PCE supports a TCP AO, and the third flag bit is used to indicate whether the first PCE supports TLS ⟶ 101

Send the IGP route advertisement message to an area in which the communications device is located ⟶ 102

FIG. 1

OSPF PCED TLV / IS-IS sub-TLV:

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            Type               |           Length              |
+-+-+-+-+-+-+-+-+-+-+-+-+-+-+-+-+-+-+-+-+-+-+-+-+-+-+-+-+-+-+-+-+
|                                                               |
|   //                    Sub-TLVs                       //     |
|                                                               |
+-+-+-+-+-+-+-+-+-+-+-+-+-+-+-+-+-+-+-+-+-+-+-+-+-+-+-+-+-+-+-+-+
```

PCE-ADDRESS sub-TLV:

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            Type               |           Length              |
+-+-+-+-+-+-+-+-+-+-+-+-+-+-+-+-+-+-+-+-+-+-+-+-+-+-+-+-+-+-+-+-+
|        Address type           |          Reserved             |
+-+-+-+-+-+-+-+-+-+-+-+-+-+-+-+-+-+-+-+-+-+-+-+-+-+-+-+-+-+-+-+-+
|                       PCE IP address                          |
+-+-+-+-+-+-+-+-+-+-+-+-+-+-+-+-+-+-+-+-+-+-+-+-+-+-+-+-+-+-+-+-+
```

PCE-CAP-FLAGS sub-TLV:

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            Type               |           Length              |
+-+-+-+-+-+-+-+-+-+-+-+-+-+-+-+-+-+-+-+-+-+-+-+-+-+-+-+-+-+-+-+-+
|                                                               |
|   //                    Flag bits                      //     |
|                                                               |
+-+-+-+-+-+-+-+-+-+-+-+-+-+-+-+-+-+-+-+-+-+-+-+-+-+-+-+-+-+-+-+-+
```

FIG. 2a

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             Type              |           Length              |
+-+-+-+-+-+-+-+-+-+-+-+-+-+-+-+-+-+-+-+-+-+-+-+-+-+-+-+-+-+-+-+-+
|                          Port number                          |
+-+-+-+-+-+-+-+-+-+-+-+-+-+-+-+-+-+-+-+-+-+-+-+-+-+-+-+-+-+-+-+-+
```
FIG. 2b
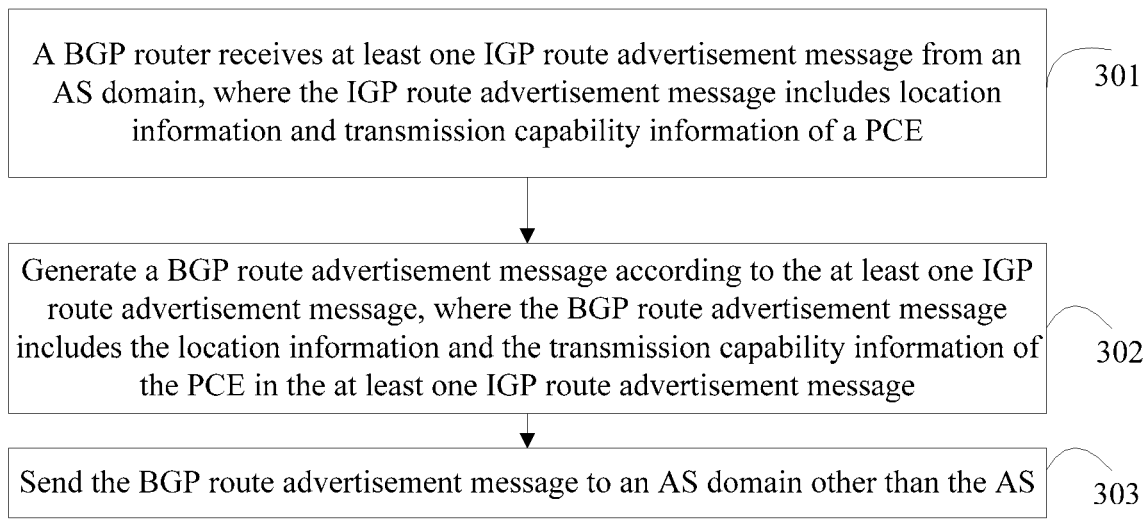
FIG. 3
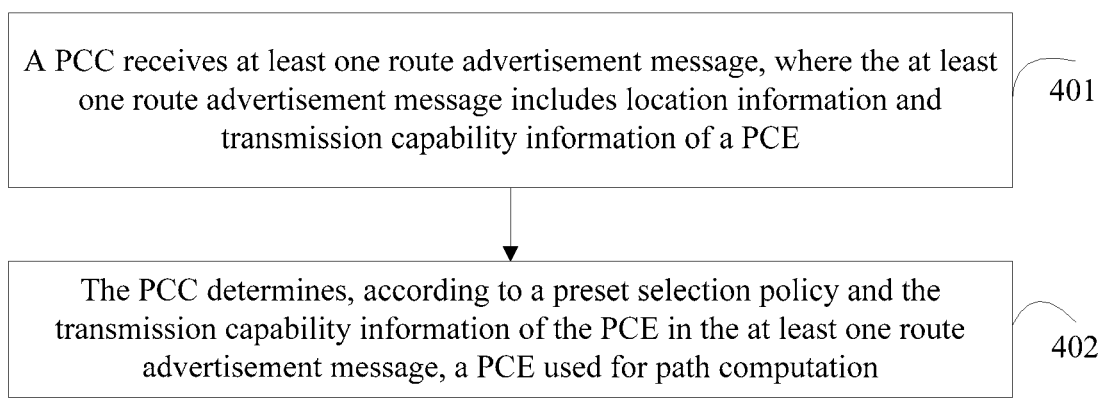
FIG. 4

METHOD FOR DETERMINING PATH COMPUTATION ELEMENT AND COMMUNICATIONS DEVICE

CROSS-REFERENCE TO RELATED APPLICATIONS

This application is a continuation of U.S. patent application Ser. No. 15/134,115, filed on Apr. 20, 2016, which is a continuation of International Patent Application No. PCT/CN2014/088445, filed on Oct. 13, 2014. The International Application claims priority to Chinese Patent Application No. 201310496882.0, filed on Oct. 21, 2013. All of the aforementioned patent applications are hereby incorporated by reference in their entireties.

TECHNICAL FIELD

Embodiments of the present disclosure relate to the communications field, and in particular, to a method for determining a path computation element (PCE) and a communications device.

BACKGROUND

A PCE is a functional entity that is responsible for path computation in a network, and may be an independent network device, or may be an apparatus or an application program in a network device. Based on a known network topology and a constraint condition, the PCE obtains, by means of computation according to a request from a path computation client (PCC), a path that meets the constraint condition.

Generally, communication is performed between a PCC and a PCE and between a PCE and a PCE by using PCE communication protocol (PCEP), a path computation request is submitted, and a path computation result is obtained. A PCC first obtains information such as location, a path computation scope, a neighbor PCE, and path computation capability of a PCE by using a PCE discovery mechanism, to select a PCE that meets a requirement, to submit a path computation request. According to the standard, generally, a Transmission Control Protocol (TCP) connection is first established between a PCC and a PCE, and then a PCEP session is established based on the TCP connection, that is, PCEP over TCP. If protection needs to be provided for the TCP connection, a TCP message-digest algorithm 5 (MD5 option may be used. However, with the development of a network technology, the TCP MD5 is replaced by a TCP authentication option (AO), and the Transport Layer Security (TLS) Encryption Protocol that provides secrecy and data integrity also emerges.

If there are various transmission protocols, how to effectively establish a PCEP session becomes an urgent problem to be resolved.

SUMMARY

The present disclosure provides a method for determining a PCE and a communications device, which are used to resolve a problem of how to effectively establish a PCEP session.

According to a first aspect, an embodiment of the present disclosure provides a method for determining a path computation element, including:

receiving, by a path computation client PCC, at least one route advertisement message, where the route advertisement message includes location information and transmission capability information of a path computation element PCE, where the transmission capability information of the PCE includes a first flag bit, a second flag bit, and a third flag bit, where the first flag bit is used to indicate whether the PCE supports a Transmission Control Protocol TCP message-digest algorithm 5 MD5 option, the second flag bit is used to indicate whether the PCE supports a TCP authentication option AO, and the third flag bit is used to indicate whether the PCE supports Transport Layer Security TLS; and determining, according to a preset selection policy and the transmission capability information of the PCE in the at least one route advertisement message, a PCE used for path computation.

According to a second aspect, an embodiment of the present disclosure provides a communications device, including:

a receiving unit, configured to receive at least one route advertisement message, where the route advertisement message includes location information and transmission capability information of a path computation element PCE, and the transmission capability information of the PCE includes a first flag bit, a second flag bit, and a third flag bit, where the first flag bit is used to indicate whether the PCE supports a Transmission Control Protocol TCP message-digest algorithm 5 MD5 option, the second flag bit is used to indicate whether the PCE supports a TCP authentication option AO, and the third flag bit is used to indicate whether the PCE supports Transport Layer Security TLS; and a determining unit, configured to determine, according to a preset selection policy and the transmission capability information of the PCE in the at least one route advertisement message, a PCE used for path computation.

According to a third aspect, an embodiment of the present disclosure provides a communications device, including:

a receiving unit, configured to receive at least one Interior Gateway Protocol IGP route advertisement message from an autonomous system AS domain, where the IGP route advertisement message includes location information and transmission capability information of a path computation element PCE, and the transmission capability information of the PCE includes a first flag bit, a second flag bit, and a third flag bit, where the first flag bit is used to indicate whether the PCE supports a Transmission Control Protocol TCP message-digest algorithm 5 MD5 option, the second flag bit is used to indicate whether the PCE supports a TCP authentication option AO, and the third flag bit is used to indicate whether the PCE supports Transport Layer Security TLS;

a generating unit, configured to generate a Border Gateway Protocol (BGP) route advertisement message according to the at least one IGP route advertisement message, where the BGP route advertisement message includes the location information and the transmission capability information of the PCE in the at least one IGP route advertisement message; and a sending unit, configured to send the BGP route advertisement message to an AS domain other than the AS domain.

According to a fourth aspect, an embodiment of the present disclosure provides a communications device, including:

a generating unit, configured to generate an Interior Gateway Protocol IGP route advertisement message, where the IGP route advertisement message includes location information and transmission capability information of a path computation element PCE, and the transmission capability information of the PCE includes a first flag bit, a second flag bit, and a third flag bit, where the first flag bit is used to indicate whether the PCE supports a Transmission Control Protocol TCP message-digest algorithm 5 MD5 option, the second flag bit is used to indicate whether the PCE supports a TCP authentication option AO, and the third flag bit is used to indicate whether the PCE supports Transport Layer Security TLS; and a sending unit, configured to send the IGP route advertisement message to an area in which the communications device is located.

According to the method for determining a path computation element and the communications device provided in the embodiments of the present disclosure, a PCC receives a route advertisement message that carries location information and transmission capability information of a PCE, and selects, according to the transmission capability information of the PCE and a preset selection policy, a PCE that meets a transmission capability supported by the PCC, to perform path computation, which can establish a PCEP session more effectively, and further improve efficiency and a success rate of submitting a path computation request and obtaining a path computation result by the PCC.

BRIEF DESCRIPTION OF DRAWINGS

FIG. 1 is a flowchart of a method for advertising a transmission capability according to an embodiment of the present disclosure;

FIG. 2a is a schematic diagram of a format of an OSPF PCED TLV or an IS-IS PCED sub-TLV according to an embodiment of the present disclosure;

FIG. 2b is a schematic diagram of a format of a sub-TLV that carries port information according to an embodiment of the present disclosure;

FIG. 3 is a flowchart of another method for advertising a transmission capability according to an embodiment of the present disclosure;

FIG. 4 is a flowchart of a method for determining a path computation element according to an embodiment of the present disclosure;

DESCRIPTION OF EMBODIMENTS

Figure 5:
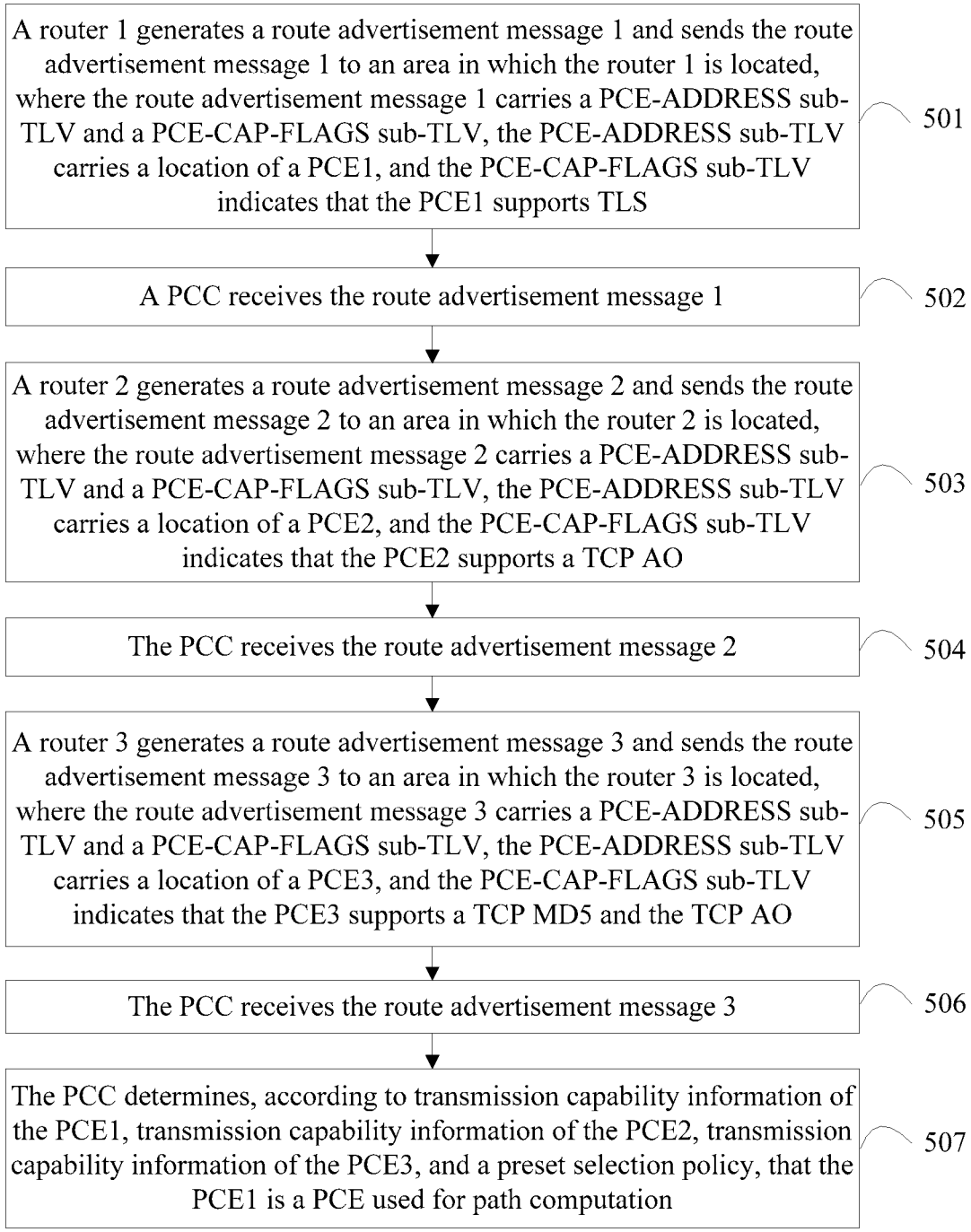
FIG. 5 is a flowchart of a method for advertising a transmission capability and determining a path computation element according to an embodiment of the present disclosure.

To make the objectives, technical solutions, and advantages of the embodiments of the present disclosure clearer, the following describes the technical solutions in the embodiments of the present disclosure with reference to the accompanying drawings in the embodiments of the present disclosure.

To a provide thorough understanding, the following further describes the specific embodiments of the present disclosure in detail with reference to the accompanying drawings. The embodiments are not intended to limit the protection scope of the present disclosure.

Because there are various transmission protocols, if transmission protocol information is not configured or negotiated in advance between a PCC and a PCE, establishment of a PCEP session between the PCC and the PCE may fail, and the PCC cannot submit a path computation request to the PCE and cannot obtain a path computation result. The PCC needs to wait a new route advertisement message, such as an OSPF link state advertisement (LSA), to determine a PCE that meets the path computation request from the PCC and supports TLS, so that the PCEP session can be successfully established, and further, the path computation request can be submitted and the path computation result can be obtained. In this way, before the PCC can successfully establish the PCEP session to obtain the path computation result, the PCC may fail for many times, thereby reducing efficiency of path computation in a network. In view of this, the present disclosure provides technical solutions in which a route advertisement message that carries a transmission capability of a PCE is sent to a PCC, so that the PCC determines, according to the transmission capability of the PCE in the route advertisement message, a PCE used for path computation.

The following describes the technical solutions of the present disclosure in detail.

As shown in FIG. 1, an embodiment of the present disclosure provides a method for advertising a transmission capability, where the method includes the following steps:

101. A communications device generates an IGP route advertisement message, where the IGP route advertisement message includes location information and transmission capability information of a first path computation element PCE.

The transmission capability information of the first PCE includes a first flag bit, a second flag bit, and a third flag bit, where the first flag bit is used to indicate whether the first PCE supports a Transmission Control Protocol TCP message-digest algorithm 5 MD5 option (PCEP over TCP MD5), the second flag bit is used to indicate whether the first PCE supports a TCP authentication option AO (PCEP over TCP AO), and the third flag bit is used to indicate whether the first PCE supports Transport Layer Security TLS (PCEP over TLS).

It may be understood that if the second flag bit indicates that the first PCE supports the TCP AO and the third flag bit indicates that the first PCE supports the TLS, the second flag bit and the third flag bit together indicate that the first PCE supports the TLS and the TCP AO (PCEP over TLS and TCP AO). Certainly, optionally, the transmission capability information of the first PCE further includes a fourth flag bit, where the fourth flag bit is used to indicate whether the first PCE supports the TLS and the TCP AO.

Further, the route advertisement message may further include port information of the first PCE, where the port information includes a port type and a port number. The port type includes a PCEP over TCP (PCEP over TCP) port, and a PCEP over TLS (PCEP over TLS) port; or the port type includes a PCEP over TCP MD5 option (PCEP over TCP MD5) port, a PCEP over TCP AO (PCEP over TCP AO) port, and a PCEP over TLS (PCEP over TLS) port. Further, optionally, if the transmission capability information of the first PCE further includes the fourth flag bit, accordingly, the port type includes a PCEP over TLS and TCP AO (PCEP over TLS and TCP AO) port.

102. Send the IGP route advertisement message to an area in which the communications device is located.

The communications device sends the IGP route advertisement message to the area in which the communications device is located, which generally may also mean that the IGP route advertisement message is flooded, so as to advertise a transmission capability of the first PCE to a member within the area in which the communications device is located.

In this embodiment, the communications device is an IGP router, and the area in which the communications device is located is an IGP area. IGP includes OSPF and IS-IS. Accordingly, the communications device is an OSPF router, the area in which the communications device is located is an OSPF area, and the IGP route advertisement message is an OSPF LSA; or the communications device is an IS-IS router, the area in which the communications device is located is an IS-IS area, and the IGP route advertisement message is an IS-IS LSA.

When a PCC and a PCE support a same Interior Gateway Protocol (IGP) in a routing domain, such as the Open Shortest Path First (OSPF) protocol or the Intermediate System to Intermediate System (IS-IS) protocol, dynamic discovery of the PCE can be implemented by using the OSPF Protocol or the IS-IS Protocol.

In a case of the OSPF protocol, by using a flooding mechanism of the OSPF protocol, a PCE Discovery (PCED) type-length-value (TLV) is used to flood PCE information to a member within an entire OSPF area by using an OSPF control message, such as a link state advertisement LSA, so as to advertise the information related to the PCE, where the information includes a location, a path computation scope, a neighbor PCE, a communication capability, a path computation capability, and the like of the PCE; and in a case of the IS-IS protocol, a PCED sub-TLV is used to flood PCE information to a member within an entire IS-IS area by using an IS-IS control message, such as an LSA, so as to advertise the information related to the PCE, where the information includes a location, a path computation scope, a neighbor PCE, a communication capability, a path computation capability, and the like of the PCE.

The path computation scope of the PCE may include an IS-IS intra-area, an IS-IS inter-area, an inter-AS (AS), an inter-layer, and the like.

The location information of the first PCE, such as an Internet Protocol version 4 (IPv4) address or an Internet Protocol version 6 (IPv6) address, may be carried in a PCE-ADDRESS sub-TLV of the PCED TLV in the OSPF protocol or of the PCED sub-TLV in the IS-IS protocol. In this embodiment of the present disclosure, by extending the PCED TLV in the OSPF protocol or the PCED sub-TLV in the IS-IS protocol, the transmission capability information of the PCE may be used to define three currently unused flag bits in a PCE-CAP-FLAGS sub-TLV as the foregoing first flag bit, second flag bit, and third flag bit, which are respectively used to indicate whether the first PCE supports the TCP MD5 option, whether the first PCE supports the TCP AO, and whether the first PCE supports the TLS. Further, the fourth flag bit may be further defined and is used to indicate whether the first PCE supports the TLS and the TCP AO.

A format of the PCED TLV in the OSPF protocol or the PCED sub-TLV in the IS-IS protocol may be shown in FIG. 2a. A correspondence between four extended flag bits in the PCE-ADDRESS sub-TLV in FIG. 2a and PCE capability descriptions may be as follows:

| Flag Bit (bits) | Capability Description (capability description) |
| --- | --- |
| 12 | Indicating whether to support a TCP MD5 (PCEP over TCP MD5) |
| 13 | Indicating whether to support a TCP AO (PCEP over TCP AO) |
| 14 | Indicating whether to support TLS (PCEP over TLS) |
| 15 | Indicating whether to support TLS and a TCP AO (PCEP over TLS and TCP AO) |

It should be noted that in FIG. 2a, defining of the four flag bits, namely, 12, 13, 14, and 15 is used as an example, and the foregoing flag bits and the corresponding capability descriptions are also used merely as an example, and constitute no limitation to the present disclosure.

In this embodiment of the present disclosure, by extending PCE capability discovery in the OSPF or IS-IS protocol, advertisement of the transmission capability of the PCE can be implemented, so that the PCC can select a PCE that matches a transmission capability of the PCC, to improve efficiency and a success rate of submitting a path computation request and obtaining a path computation result by the PCC.

Further, the PCED TLV in the OSPF protocol or the PCED sub-TLV in the IS-IS protocol may be further extended, a sub-TLV that carries the port information of the first PCE is defined, and a format may be shown in FIG. 2b. The port information of the first PCE may be carried in two implementation manners:

In one manner, two sub-TLVs are defined to carry the port information of the PCE, where one sub-TLV carries a PCEP over TCP port, and the other sub-TLV carries a PCEP over TLS port. A PCE that supports the TCP MD5 option and a PCE that supports the TCP AO share the sub-TLV that carries the PCEP over TCP port, and a PCE that supports the TLS uses the sub-TLV of the PCEP over TLS port. Optionally, if the transmission capability information of the first PCE further includes the fourth flag bit, a PCE that supports the TLS and a PCE that supports the TLS and the TCP AO share the sub-TLV of the PCEP over TLS port.

In the other manner, three sub-TLVs are defined to respectively carry a PCEP over TCP MD5 option port, a PCEP over TCP AO port, and a PCEP over TLS port. Further, if the transmission capability information of the first PCE further includes the fourth flag bit, a sub-TLV may be further defined to carry a PCEP over TLS and TCP AO port.

For example, four flag bits in the PCE-ADDRESS sub-TLV are extended and used to support the transmission capability of the PCE, and if the four sub-TLVs are defined to respectively carry corresponding ports of the foregoing four transmission capabilities, if the first flag bit in the PCE-CAP-FLAGS sub-TLV indicates that the PCE supports the TCP MD5 option, a sub-TLV of the PCEP over TCP MD5 port is carried in the PCED TLV in the OSPF protocol or in the PCED sub-TLV in the IS-IS protocol;

if the second flag bit in the PCE-CAP-FLAGS sub-TLV indicates that the PCE supports the TCP AO, a sub-TLV of the PCEP over TCP AO port is carried in the PCED TLV in the OSPF protocol or in the PCED sub-TLV in the IS-IS protocol;

if the third flag bit in the PCE-CAP-FLAGS sub-TLV indicates that the PCE supports the TLS, a sub-TLV of the PCEP over TLS port is carried in the PCED TLV in the OSPF protocol or in the PCED sub-TLV in the IS-IS protocol; and if the fourth flag bit in the PCE-CAP-FLAGS sub-TLV indicates that the PCE supports the TLS and the TCP AO, a sub-TLV of the PCEP over TLS and TCP AO port is carried in the PCED TLV in the OSPF protocol or in the PCED sub-TLV in the IS-IS protocol.

If two sub-TLVs are defined to respectively carry corresponding ports that support a TCP and TLS transmission capability, in the PCE-CAP-FLAGS sub-TLV, if the first flag bit indicates that the PCE supports the TCP MD5 option, or the second flag bit indicates that the PCE supports the TCP AO, or the first flag bit indicates that the PCE supports the TCP MD5 option and the second flag bit indicates that the PCE supports the TCP AO, a sub-TLV of the PCEP over TCP port is carried in the PCED TLV in the OSPF protocol or in the PCED sub-TLV in the IS-IS protocol; and in the PCE-CAP-FLAGS sub-TLV, if the third flag bit indicates that the PCE supports the TLS, or the fourth flag bit indicates that the PCE supports the TLS and the TCP AO, or the third flag bit indicates that the PCE supports the TLS and the fourth flag bit indicates that the PCE supports the TLS and the TCP AO, a sub-TLV of the PCEP over TLS port is carried in the PCED TLV in the OSPF protocol or in the PCED sub-TLV in the IS-IS protocol.

Further, before the route advertisement message is generated, the method may further include: receiving, by the communications device, registration information of the first PCE, where the registration information includes the transmission capability of the first PCE. The registration information further includes a path computation scope, a neighbor PCE, a communication capability, a path computation capability, and the like of the first PCE.

Further, the route advertisement message may further include location information and transmission capability information of a second PCE, and optionally, further includes port information of the second PCE. Accordingly, before the route advertisement message is generated, the method may further include: receiving, by the communications device, registration information of the second PCE, where the registration information includes a transmission capability information of the second PCE.

According to the method for advertising a transmission capability provided in this embodiment of the present disclosure, a PCED TLV in the OSPF protocol or a PCED sub-TLV in the IS-IS protocol is extended, and a flag bit is defined to indicate a transmission capability of a PCE, so that advertisement of the transmission capability of the PCE can be implemented based on the OSPF protocol or the IS-IS protocol, and a PCC can select a PCE that matches a transmission capability of the PCC, which ensures that a PCEP session is effectively established between the PCC and the PCE, and improves efficiency and a success rate of path computation between the PCC and the PCE; further, a new sub-TLV is defined to carry port information corresponding to the transmission capability, and in this way, when the PCC does not know a port that is of the PCE and is used for establishing the PCEP session, the PCC may directly acquire port information from an OSPF LSA or an IS-IS LSA, which further ensures that the PCEP session is effectively established between the PCC and the PCE.

Further, based on the foregoing method shown in FIG. 1, as shown in FIG. 3, an embodiment of the present disclosure provides another method for advertising a transmission capability, where the method includes the following steps:

301. A Border Gateway Protocol (BGP) router receives at least one IGP route advertisement message from an autonomous system AS domain, where the IGP route advertisement message includes location information and transmission capability information of a path computation element PCE.

The transmission capability information of the PCE includes a first flag bit, a second flag bit, and a third flag bit, where the first flag bit is used to indicate whether the PCE supports a Transmission Control Protocol TCP message-digest algorithm 5 option, the second flag bit is used to indicate whether the PCE supports a TCP authentication option AO, and the third flag bit is used to indicate whether the PCE supports Transport Layer Security TLS. Optionally, the transmission capability information of the PCE further includes a fourth flag bit, where the fourth flag bit is used to indicate whether the PCE supports the TLS and the TCP AO.

The IGP route advertisement message is an OSPF LSA or an IS-IS LSA.

The BGP router may be a BGP speaker.

In specific implementation, three currently unused flag bits in a PCE-CAP-FLAGS sub-TLV of a PCED TLV in the OSPF protocol or of a PCED sub-TLV in the IS-IS protocol may be defined as the foregoing first flag bit, second flag bit, and third flag bit, which are respectively used to indicate whether the PCE supports the TCP MD5 option, whether the PCE supports the TCP AO, and whether the PCE supports the TLS. Further, the fourth flag bit may be further defined and is used to indicate whether the PCE supports the TLS and the TCP AO. Specifically, reference may be made to the method shown in FIG. 1 in the present disclosure, and details are not described herein again. In this way, based on PCE capability discovery in the extended OSPF or IS-IS protocol, advertisement of a transmission capability of the PCE can be implemented.

302. Generate a Border Gateway Protocol (BGP) route advertisement message according to the at least one IGP route advertisement message, where the BGP route advertisement message includes the location information and the transmission capability information of the PCE in the at least one IGP route advertisement message.

For example, it is assumed that the BGP router receives two IGP route advertisement messages: a first IGP route advertisement message and a second IGP route advertisement message, where the first IGP route advertisement message includes location information and transmission capability information of a first PCE, the second route advertisement message includes location information and transmission capability information of a second PCE, and the first IGP route advertisement message and the second IGP route advertisement message come from an AS domain. The BGP router generates the BGP route advertisement message according to the first route advertisement message and the second route advertisement message, where the BGP route advertisement message includes the location information and the transmission capability information of the first PCE and the location information and the transmission capability information of the second PCE.

In this embodiment of the present disclosure, the BGP router may generate a BGP route advertisement message according to only one IGP route advertisement message, or may generate a BGP route advertisement message according to multiple IGP route advertisement messages received from an AS domain, and send, to another AS domain by using the BGP route advertisement message, location information and transmission capability information of all PCEs carried in the multiple IGP route advertisement messages.

Optionally, after the BGP router receives an IGP route advertisement message, the method further includes: checking whether the IGP route advertisement message includes the transmission capability information of the PCE; and if the transmission capability information of the PCE is included, generating a BGP route advertisement message that includes the location information and the transmission capability information of the PCE; or if the transmission capability information of the PCE is not included, performing processing according to a current standard specification.

In specific implementation, the BGP protocol may be extended, and a PCE-ADDRESS sub-TLV and a PCE-CAP-FLAGS sub-TLV are defined in a network layer reachability information (NLRI) TLV in the BGP protocol and are carried in the BGP route advertisement message. Formats of the PCE-ADDRESS sub-TLV and the PCE-CAP-FLAGS sub-TLV may be the same as the foregoing extended PCED TLV in the OSPF Protocol or the foregoing extended PCED sub-TLV in the IS-IS protocol, as shown in FIG. 2a. Optionally, by extending a capability optional parameter in the BGP protocol, the transmission capability information of the PCE may also be used to define a currently unused capability code, where the code is used to identify the transmission capability of the PCE. Three capability codes are defined to be respectively used to identify whether the TCP MD5 option is supported, whether the TCP AO is supported, and whether the TLS is supported; further, a capability code may be further defined to be used to identify whether the TLS and the TCP AO are supported.

Further, the IGP route advertisement message may further include port information of the PCE, where the port information includes a port type and a port number. The port type includes a PCEP over TCP port, and a PCEP over TLS port; or the port type includes: a PCEP over TCP MD5 option port, a PCEP over TCP AO port, and a PCEP over TLS port, and further, may further include a PCEP over TLS and TCP AO port. In specific implementation, the PCED TLV in the OSPF protocol or the PCED sub-TLV in the IS-IS protocol may be extended, a sub-TLV that carries port information of the PCE is defined, and a format may be shown in FIG. 2b. Specifically, reference may be made to the method shown in FIG. 1 in the present disclosure, and details are not described herein again.

Accordingly, the BGP route advertisement message may further include the port information of the PCE. In specific implementation, the BGP protocol may be extended. For example, the sub-TLV that carries the port information of the PCE is defined in NLRI, and a format may be shown in FIG. 2b. Being similar to extension of the OSPF protocol or the IS-IS protocol, the port information of the PCE may also be carried in two implementation manners:

In one manner, two sub-TLVs are defined to carry the port information of the PCE, where one sub-TLV carries a PCEP over TCP port, and the other sub-TLV carries a PCEP over TLS port. A PCE that supports the TCP MD5 option and a PCE that supports the TCP AO share the sub-TLV that carries the PCEP over TCP port, and a PCE that supports the TLS uses the sub-TLV of the PCEP over TLS port. Optionally, if the transmission capability information of the PCE further includes the fourth flag bit, a PCE that supports the TLS and a PCE that supports the TLS and the TCP AO share the sub-TLV of the PCEP over TLS port.

In the other manner, three sub-TLVs are defined to respectively carry a PCEP over TCP MD5 option port, a PCEP over TCP AO port, and a PCEP over TLS port. Further, if the transmission capability information of the PCE further includes the fourth flag bit, a sub-TLV may be further defined to carry a PCEP over TLS and TCP AO port.

303. Send the BGP route advertisement message to an AS domain other than the AS domain.

Assuming that the at least one IGP route advertisement message comes from a first AS and the BGP router is located on a border between the first AS and a second AS, the BGP route advertisement message is sent to the second AS to advertise a transmission capability of the first PCE to a member within the second AS.

It may be understood that as described in the method shown in FIG. 1 in the present disclosure, the IGP route advertisement message may include location information and transmission capability information of only one PCE, or may include location information and transmission capability information of multiple PCEs. Accordingly, the BGP route advertisement message includes the location information and the transmission capability information of the multiple PCEs in the IGP route advertisement message.

According to the method for advertising a transmission capability provided in this embodiment of the present disclosure, a BGP router implements advertisement of a PCE transmission capability between ASs by using an extended BGP protocol, which can ensure that a PCEP session is effectively established between a PCC and a PCE in inter-ASs, and can improve efficiency and a success rate of path computation between the PCC and the PCE.

Further, based on the foregoing methods shown in FIG. 1 and FIG. 3, as shown in FIG. 4, an embodiment of the present disclosure provides a method for determining a path computation element, where the method includes the following steps:

401. A PCC receives at least one route advertisement message, where the route advertisement message includes location information and transmission capability information of a path computation element PCE.

The transmission capability information of the PCE includes a first flag bit, a second flag bit, and a third flag bit, where the first flag bit is used to indicate whether the PCE supports a TCP MD5 option, the second flag bit is used to indicate whether the PCE supports a TCP AO, and the third flag bit is used to indicate whether the PCE supports TLS.

Optionally, when a flag bit is 0, it indicates not supporting; when a flag bit is 1, it indicates supporting. For example, in the route advertisement message, if the first flag bit is 1, it indicates that the PCE supports the TCP MD5 option; if the second flag bit is 0, it indicates that the PCE does not support the TCP AO; and if the third flag bit is 1, it indicates that the PCE supports the TLS.

It may be understood that if the second flag bit indicates that the PCE supports the TCP AO and the third flag bit indicates that the PCE supports the TLS, the second flag bit and the third flag bit together indicate that the PCE supports the TLS and the TCP AO. Certainly, optionally, the transmission capability information of the PCE further includes a fourth flag bit, where the fourth flag bit is used to indicate whether the PCE supports the TLS and the TCP AO.

Optionally, the route advertisement message further includes port information of the PCE, where the port information includes a port type and a port number. The port type includes a path computation protocol PCEP over TCP port, and a PCEP over TLS port; or the port type includes a PCEP over TCP digest algorithm 5 option port, a PCEP over TCP AO port, and a PCEP over TLS port. Further, optionally, if the transmission capability information of the PCE further includes the fourth flag bit, accordingly, the port type includes a PCEP over TLS and TCP AO port.

The route advertisement message may be an IGP route advertisement message (specifically, reference may be made to the method shown in FIG. 1 in the present disclosure) or a BGP route advertisement message (specifically, reference may be made to the method shown in FIG. 3 in the present disclosure).

The IGP route advertisement message may be an OSPF LSA or an IS-IS LSA. In specific implementation, the location information of the PCE, such as an IPv4 address or an IPv6 address, may be carried in a PCE-ADDRESS sub-TLV of a PCED TLV in the OSPF LSA or of a PCED sub-TLV in the IS-IS LSA. By extending a PCED TLV in the OSPF protocol or a PCED sub-TLV in the IS-IS protocol, the transmission capability information of the PCE may be used to respectively define three currently unused flag bits in a PCE-CAP-FLAGS sub-TLV as the foregoing first flag bit, second flag bit, and third flag bit; further, the fourth flag bit may be further defined. A specific format of the PCED TLV in the OSPF protocol or the PCED sub-TLV in the IS-IS protocol may be shown in FIG. 2a. A correspondence between four extended flag bits in the PCE-ADDRESS sub-TLV in FIG. 2a and PCE capability descriptions may be as follows:

| Flag Bit (bits) | Capability Description (capability description) |
|---|---|
| 12 | Indicating whether to support a TCP MD5 (PCEP over TCP MD5) |
| 13 | Indicating whether to support a TCP AO (PCEP over TCP AO) |
| 14 | Indicating whether to support TLS (PCEP over TLS) |
| 15 | Indicating whether to support TLS and a TCP AO (PCEP over TLS and TCP AO) |

It should be noted that in FIG. 2a, defining of the four flag bits, namely, 12, 13, 14, and 15 is used as an example, and the foregoing capability descriptions corresponding to all flag bits are also used merely as an example, and constitute no limitation to the present disclosure.

In this embodiment of the present disclosure, by extending PCE capability discovery in the OSPF or IS-IS protocol, advertisement of a transmission capability of the PCE is implemented. The PCC receives the route advertisement message that carries the transmission capability information of the PCE and selects a PCE that matches a transmission capability of the PCC, which can ensure that a PCEP session is effectively established between the PCC and the PCE, and further improve efficiency and a success rate of submitting a path computation request and obtaining a path computation result by the PCC.

Further, the PCED TLV in the OSPF protocol or the PCED sub-TLV in the IS-IS protocol may be further extended, a sub-TLV that carries the port information of the PCE is defined, and a format may be shown in FIG. 2b. The port information of the PCE may be carried in two implementation manners:

In one manner, two sub-TLVs are defined to carry the port information of the PCE, where one sub-TLV carries a PCEP over TCP port, and the other sub-TLV carries a PCEP over TLS port. A PCE that supports the TCP MD5 option and a PCE that supports the TCP AO share the sub-TLV that carries the PCEP over TCP port, and a PCE that supports the TLS uses the sub-TLV of the PCEP over TLS port. Optionally, if the transmission capability information of the PCE further includes the fourth flag bit, a PCE that supports the TLS and a PCE that supports the TLS and the TCP AO share the sub-TLV of the PCEP over TLS port.

In the other manner, three sub-TLVs are defined to respectively carry a PCEP over TCP MD5 option port, a PCEP over TCP AO port, and a PCEP over TLS port. Further, if the transmission capability information of the PCE further includes the fourth flag bit, a sub-TLV may be further defined to carry a PCEP over TLS and TCP AO port.

For example, four flag bits in the PCE-ADDRESS sub-TLV are extended and used to support the transmission capability of the PCE, and if the four sub-TLVs are defined to respectively carry corresponding ports of the foregoing four transmission capabilities, if the first flag bit in the PCE-CAP-FLAGS sub-TLV indicates that the PCE supports the TCP MD5 option, a sub-TLV of the PCEP over TCP MD5 port is carried in the PCED TLV in the OSPF protocol or in the PCED sub-TLV in the IS-IS protocol;

if the second flag bit in the PCE-CAP-FLAGS sub-TLV indicates that the PCE supports the TCP AO, a sub-TLV of the PCEP over TCP AO port is carried in the PCED TLV in the OSPF protocol or in the PCED sub-TLV in the IS-IS protocol;

if the third flag bit in the PCE-CAP-FLAGS sub-TLV indicates that the PCE supports the TLS, a sub-TLV of the PCEP over TLS port is carried in the PCED TLV in the OSPF protocol or in the PCED sub-TLV in the IS-IS protocol; and if the fourth flag bit in the PCE-CAP-FLAGS sub-TLV indicates that the PCE supports the TLS and the TCP AO, a sub-TLV of the PCEP over TLS and TCP AO port is carried in the PCED TLV in the OSPF protocol or in the PCED sub-TLV in the IS-IS protocol.

If two sub-TLVs are defined to respectively carry corresponding ports that support a TCP and TLS transmission capability, in the PCE-CAP-FLAGS sub-TLV, if the first flag bit indicates that the PCE supports the TCP MD5 option, or the second flag bit indicates that the PCE supports the TCP AO, or the first flag bit indicates that the PCE supports the TCP MD5 option and the second flag bit indicates that the PCE supports the TCP AO, a sub-TLV of the PCEP over TCP port is carried in the PCED TLV in the OSPF protocol or in the PCED sub-TLV in the IS-IS protocol; and in the PCE-CAP-FLAGS sub-TLV, if the third flag bit indicates that the PCE supports the TLS, or the fourth flag bit indicates that the PCE supports the TLS and the TCP AO, or the third flag bit indicates that the PCE supports the TLS and the fourth flag bit indicates that the PCE supports the TLS and the TCP AO, a sub-TLV of the PCEP over TLS port is carried in the PCED TLV in the OSPF protocol or in the PCED sub-TLV in the IS-IS protocol.

The BGP route advertisement message includes the location information and the transmission capability information of the PCE, which can be implemented by extending the BGP protocol in specific implementation. For example, a PCE-ADDRESS sub-TLV and a PCE-CAP-FLAGS sub-TLV are defined in an NLRI TLV in the BGP protocol and are carried in the BGP route advertisement message, where the PCE-ADDRESS sub-TLV is used to carry the location information of the PCE, and the PCE-CAP-FLAGS sub-TLV is used to carry the transmission capability information of the PCE. A specific format may be the same as the foregoing extended PCED TLV in the OSPF protocol or the foregoing extended PCED sub-TLV in the IS-IS protocol, as shown in FIG. 2a.

Further, the BGP route advertisement message may further include the port information of the PCE, where the port information includes a port type and a port number. Corresponding to the IGP route advertisement message, the port type includes a PCEP over TCP port, and a PCEP over TLS port; or the port type includes a PCEP over TCP MD5 port, a PCEP over TCP AO port, and a PCEP over TLS port, and further, may further include a PCEP over TLS and TCP AO port. In specific implementation, the BGP protocol may be extended. For example, the sub-TLV that carries the port information of the PCE is defined in NLRI, and a format may be shown in FIG. 2b. Corresponding to extension of the OSPF protocol or the IS-IS protocol, the port information of the PCE may also be carried in two implementation manners:

In one manner, two sub-TLVs are defined to carry the port information of the PCE, where one sub-TLV carries a PCEP over TCP port, and the other sub-TLV carries a PCEP over TLS port. A PCE that supports the TCP MD5 option and a PCE that supports the TCP AO share the sub-TLV that carries the PCEP over TCP port, and a PCE that supports the TLS uses the sub-TLV of the PCEP over TLS port. Optionally, if the transmission capability information of the PCE further includes the fourth flag bit, a PCE that supports the TLS and a PCE that supports the TLS and the TCP AO share the sub-TLV of the PCEP over TLS port.

In the other manner, three sub-TLVs are defined to respectively carry a PCEP over TCP MD5 option port, a PCEP over TCP AO port, and a PCEP over TLS port. Further, if the transmission capability information of the PCE further includes the fourth flag bit, a sub-TLV may be further defined to carry a PCEP over TLS and TCP AO port.

402. The PCC determines, according to a preset selection policy and the transmission capability information of the PCE in the at least one route advertisement message, a PCE used for path computation.

The preset selection policy includes:

selecting a PCE that has a transmission capability supported by the PCC, to perform path computation. For example, if the PCC supports the TCP MD5 option, and the PCE supports the TCP MD5 and the TLS according to the transmission capability information of the PCE, the PCE has the transmission capability supported by the PCC. In this case, the PCC determines, according to the preset selection policy and the transmission capability information of the PCE, that the PCE is used for path computation. Further, the preset selection policy may also be: selecting, with reference to a priority of a PCE or load information of a PCE or a preference of the PCC, a PCE that has a transmission capability supported by the PCC, to perform path computation. For example, with reference to the priority of the PCE, the preset selection policy includes: if only one PCE has the transmission capability supported by the PCC, selecting the PCE to perform path computation; or if multiple PCEs have the transmission capability supported by the PCC, selecting a PCE with a highest priority in the multiple PCEs to perform path computation.

It may be understood that in this embodiment of the present disclosure, the route advertisement message may include location information and transmission capability information of only one PCE, or may include location information and transmission capability information of multiple PCEs. The PCC may determine, according to transmission capability information of one or more PCEs in one route advertisement message, or according to transmission capability information of all PCEs in multiple route advertisement messages, a PCE used for path computation.

For example, the PCC receives a first route advertisement message and a second route advertisement message, where the first route advertisement message includes location information and transmission capability information of a first PCE, and location information and transmission capability information of a second PCE, and the second route advertisement message includes location information and transmission capability information of a third PCE.

For example, Scenario 1: a PCC1 supports the TCP MD5 option, the first PCE supports the TCP MD5 and the TLS according to the transmission capability information of the first PCE, the second PCE supports the TCP MD5 and the TCP AO according to the transmission capability information of the second PCE, and the third PCE supports the TLS and the TCP AO according to the transmission capability information of the third PCE.

In Scenario 1, according to the preset selection policy, the transmission capability information of the first PCE, the transmission capability information of the second PCE, and the transmission capability information of the third PCE, both the first PCE and the second PCE have a transmission capability supported by the PCC1, but the third PCE does not have the transmission capability supported by the PCC1. Then, the PCC1 determines that the first PCE or the second PCE is used for path computation, or may determine that the first PCE and the second PCE are used for path computation, but does not select the third PCE to perform path computation. Optionally, the PCC1 further determines, according to a priority of the first PCE and a priority of the second PCE, that the second PCE with a higher priority is used for path computation.

Alternatively, the preset selection policy includes: if the PCC supports both the TCP AO and the TCP MD5 option, preferentially selecting a PCE that supports the TCP AO, to perform path computation, and if no PCE supports the TCP AO, selecting a PCE that supports the TCP MD5 option, to perform path computation. Further, with reference to a priority of a PCE or load information of a PCE or a preference of the PCC, a PCE may be selected to perform path computation, and the preset selection policy includes: if the PCC supports both the TCP AO and the TCP MD5 option, preferentially selecting, with reference to the priority of the PCE or the load information of the PCE or the preference of the PCC, a PCE that supports the TCP AO, to perform path computation, and if no PCE supports the TCP AO, selecting, with reference to the priority of the PCE or the load information of the PCE or the preference of the PCC, a PCE that supports the TCP MD5 option, to perform path computation. For example, with reference to the priority of the PCE, the preset selection policy includes: if the PCC supports both the TCP AO and the TCP MD5 option, and if multiple PCEs support the TCP AO, selecting a PCE with a highest priority to perform path computation, or if only one PCE supports the TCP AO, determining that the PCE is used for path computation; if no PCE supports the TCP AO, and if multiple PCEs support the TCP MD5 option, selecting a PCE with a highest priority to perform path computation, or if only one PCE supports the TCP MD5 option, determining that the PCE is used for path computation.

For example, Scenario 2: a PCC2 supports the TCP AO and the TCP MD5 option, the first PCE supports the TCP MD5 and the TLS according to the transmission capability information of the first PCE, the second PCE supports the TCP MD5 and the TCP AO according to the transmission capability information of the second PCE, and the third PCE supports the TLS and the TCP AO according to the transmission capability information of the third PCE.

In Scenario 2, according to the preset selection policy, the transmission capability information of the first PCE, the transmission capability information of the second PCE, and the transmission capability information of the third PCE, both the second PCE and the third PCE support the TCP AO. Then, the PCC2 determines that the second PCE or the third PCE is used for path computation, or may determine that the second PCE and the third PCE are used for path computation, but does not select the first PCE to perform path computation. Optionally, the PCC2 further determines, according to a priority of the second PCE and a priority of the third PCE, that the second PCE with a higher priority is used for path computation.

Alternatively, the preset selection policy includes: if the PCC supports the TLS and the TCP AO, determining, according to a security requirement, a PCE used for path computation, where the security requirement includes: transport layer security, sensitive data security, and transport layer and sensitive data security. The preset selection policy includes: if the PCC supports the TLS and the TCP AO, when the security requirement is the transport layer and sensitive data security, selecting a PCE that supports the TLS and the TCP AO, to perform path computation, or when the security requirement is the transport layer security, selecting a PCE that supports the TCP AO, to perform path computation, or when the security requirement is the sensitive data security, selecting a PCE that supports the TLS, to perform path computation. Further, with reference to a priority of a PCE, a PCE used for path computation may be determined, and the preset selection policy includes: if the PCC supports the TLS and the TCP AO, determining, according to the security requirement and with reference to the priority of the PCE or load information of the PCE or a preference of the PCC, a PCE used for path computation. The preset selection policy includes: if the PCC supports the TLS and the TCP AO, and when multiple PCEs meet the security requirement, selecting, according to priorities of the multiple PCEs or load information of the multiple PCEs or the preference of the PCC, a PCE with a highest priority to perform path computation, or when only one PCE meets the security requirement, determining that the PCE is used for path computation.

For example, Scenario 3: a PCC3 supports the TLS and the TCP AO, the first PCE supports the TCP MD5 and the TLS according to the transmission capability information of the first PCE, the second PCE supports the TCP MD5 and the TCP AO according to the transmission capability information of the second PCE, and the third PCE supports the TLS and the TCP AO according to the transmission capability information of the third PCE.

In Scenario 3:

When the security requirement is the transport layer and sensitive data security, according to the preset selection policy, the transmission capability information of the first PCE, the transmission capability information of the second PCE, and the transmission capability information of the third PCE, the third PCE supports the TLS and the TCP AO. Then, the PCC3 determines that the third PCE is used for path computation, but does not select the first PCE or the second PCE to perform path computation.

When the security requirement is the sensitive data security, according to the preset selection policy, the transmission capability information of the first PCE, the transmission capability information of the second PCE, and the transmission capability information of the third PCE, both the first PCE and the third PCE support the TLS. Then, the PCC3 determines that the first PCE or the third PCE is used for path computation, or may determine that the first PCE and the third PCE are used for path computation, but does not select the second PCE to perform path computation. Optionally, the PCC3 further determines, according to a priority of the first PCE and a priority of the third PCE, that the first PCE with a higher priority is used for path computation.

When the security requirement is the transport layer security, according to the preset selection policy, the transmission capability information of the first PCE, the transmission capability information of the second PCE, and the transmission capability information of the third PCE, both the second PCE and the third PCE support the TCP AO. Then, the PCC3 determines that the second PCE or the third PCE is used for path computation, or may determine that the second PCE and the third PCE are used for path computation, but does not select the first PCE to perform path computation. Optionally, the PCC3 further determines, according to a priority of the second PCE and a priority of the third PCE, that the second PCE with a higher priority is used for path computation.

Optionally, the security requirement may be further set according to a preference of the PCC. For example, if the transport layer and sensitive data security is prior to the transport layer security and the transport layer security is prior to the sensitive data security, the preset selection policy includes: if the PCC supports the TLS and the TCP AO, preferentially selecting a PCE that supports the TLS and the TCP AO, to perform path computation; if no PCE supports the TLS and the TCP AO, preferentially selecting a PCE that supports the TCP AO, to perform path computation; and if no PCE supports the TCP AO, selecting a PCE that supports the TLS, to perform path computation.

In specific implementation, priority information of the PCE may be carried in the PCED TLV in the OSPF protocol or in the PCED sub-TLV in the IS-IS protocol. In the foregoing examples of this embodiment of the present disclosure, the priority of the second PCE is higher than the priority of the first PCE, and the priority of the first PCE is higher than the priority of the third PCE, which constitutes no limitation to the present disclosure.

Optionally, the load information of the PCE includes a load capability, a current load status, and the like of the PCE. When a PCE used for path computation is selected with reference to the load information of the PCE, for example, a PCE that has a strong load capability and whose current load is relatively light may be selected to perform path computation. Certainly, the preset selection policy may also be combined with a local policy of the PCC. For example, the local policy is to select a PCE that supports maximum transmission capabilities. Certainly, the local policy of the PCC may be statically configured, or may be dynamically adjusted according to a requirement.

It should be noted that, after the PCC selects the PCE according to the technical solution of the present disclosure, for establishing a PCEP session with the PCE, submitting a path computation request, acquiring a path computation result, and the like, reference may be made to the current standard specification, and details are not described herein again in this embodiment of the present disclosure.

According to the method for determining a path computation element provided in this embodiment of the present disclosure, a PCC receives a route advertisement message that carries transmission capability information of a PCE, and selects, according to a transmission capability of the PCE and a preset selection policy, a PCE that matches a transmission capability of the PCC, to perform path computation, which can ensure that a PCEP session is effectively established between the PCC and the PCE, and can improve a success rate and efficiency of path computation between the PCC and the PCE.

Based on the foregoing methods shown in FIG. 1, FIG. 3, and FIG. 4, the following uses specific application scenarios to describe a method for advertising a transmission capability and determining a path computation element according to the present disclosure.

It is assumed that in an OSPF area, a PCC supports TLS, a PCE1 supports the TLS, a PCE2 supports a TCP AO, and a PCE3 supports a TCP MD5 and the TCP AO. A preset selection policy is: if PCEs have a transmission capability supported by the PCC, selecting a PCE with a highest priority, to perform path computation. Referring to FIG. 5, FIG. 5 is a flowchart of a method for advertising a transmission capability and determining a path computation element according to an embodiment of the present disclosure, where the method includes the following steps:

501. A router 1 generates a route advertisement message 1 and sends the route advertisement message 1 to an area in which the router 1 is located, where the route advertisement message 1 carries a PCE-ADDRESS sub-TLV and a PCE-CAP-FLAGS sub-TLV, the PCE-ADDRESS sub-TLV carries a location of the PCE1, and the PCE-CAP-FLAGS sub-TLV indicates that the PCE1 supports the TLS.

502. The PCC receives the route advertisement message 1.

503. A router 2 generates a route advertisement message 2 and broadcasts the route advertisement message 2 within the area, where the route advertisement message 2 carries a PCE-ADDRESS sub-TLV and a PCE-CAP-FLAGS sub-TLV, the PCE-ADDRESS sub-TLV carries a location of the PCE2, and the PCE-CAP-FLAGS sub-TLV indicates that the PCE2 supports the TCP AO.

504. The PCC receives the route advertisement message 2.

505. A router 3 generates a route advertisement message 3 and broadcasts the route advertisement message 3 within the area, where the route advertisement message 3 carries a PCE-ADDRESS sub-TLV and a PCE-CAP-FLAGS sub-TLV, the PCE-ADDRESS sub-TLV carries a location of the PCE3, and the PCE-CAP-FLAGS sub-TLV indicates that the PCE3 supports the TCP MD5 and the TCP AO.

506. The PCC receives the route advertisement message 3.

It should be noted that a time sequence of steps 501 and 502, steps 503 and 504, and steps 505 and 506 is not limited. Steps 505 and 506 may be performed before steps 501 and 502, or may be performed after steps 501 and 502 and before steps 503 and 504, and certainly, steps 501 and 502, steps 503 and 504, and steps 505 and 506 may be simultaneously performed.

507. The PCC determines, according to transmission capability information of the PCE1, transmission capability information of the PCE2, transmission capability information of the PCE3, and the preset selection policy, that the PCE1 is a PCE used for path computation.

After selecting the PCE1, the PCC establishes a TLS connection with the PCE1, then establishes a PCEP session, submits a path computation request, and acquires a path computation result.

Figure 6:
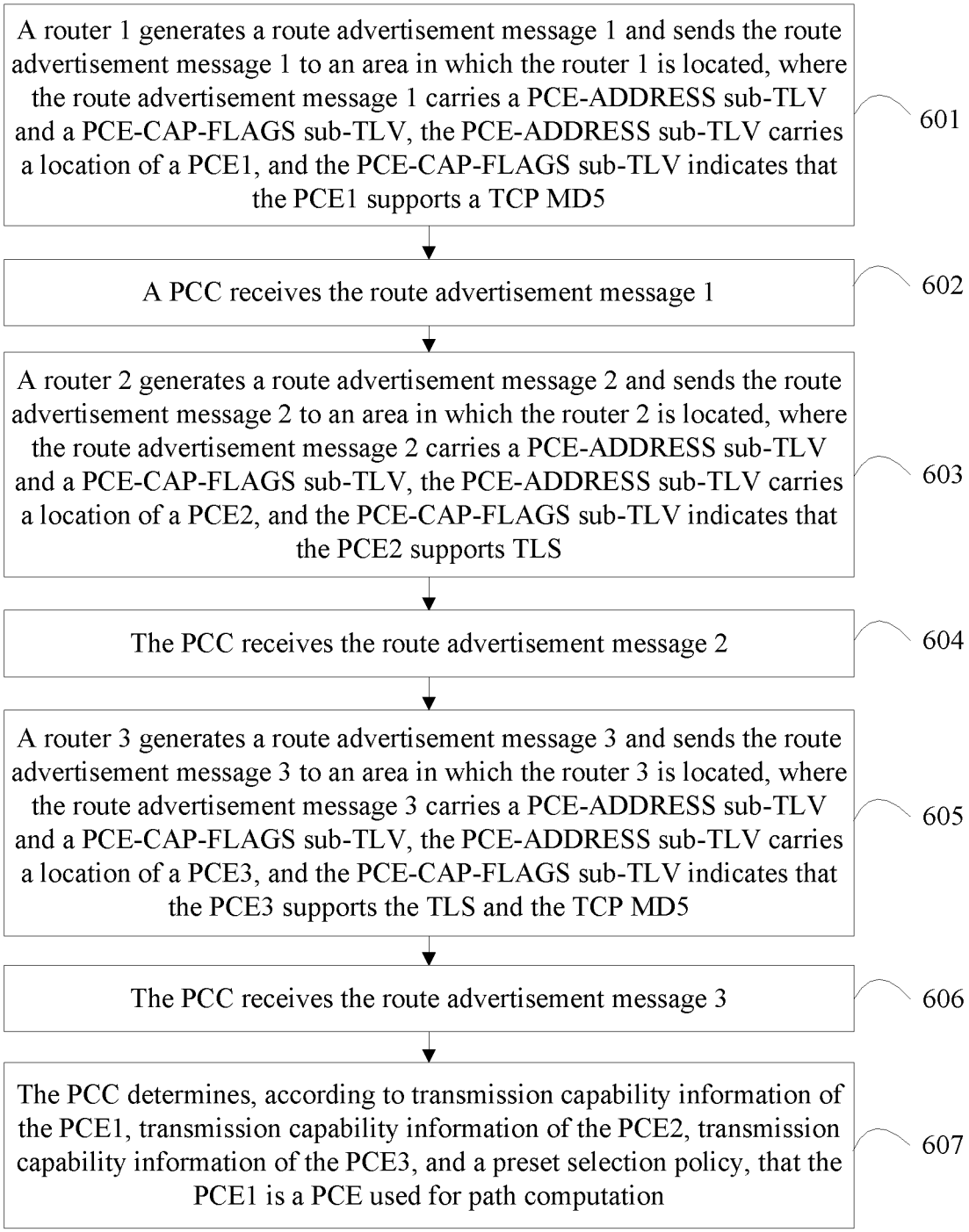
FIG. 6 is a flowchart of another method for advertising a transmission capability and determining a path computation element according to an embodiment of the present disclosure.

It is assumed that in an IS-IS area, a PCC supports a TCP AO and a TCP MD5 option, a PCE1 supports a TCP MD5 option, a PCE2 supports TLS, a PCE3 supports the TLS and the TCP MD5 option, a priority of the PCE1 is higher than a priority of the PCE2, and the priority of the PCE2 is higher than a priority of the PCE 3. A preset selection policy is: if the PCC supports both the TCP AO and the TCP MD5 option, and if multiple PCEs support the TCP AO, selecting a PCE with a highest priority to perform path computation, or if only one PCE supports the TCP AO, determining that the PCE is used for path computation; if no PCE supports the TCP AO, and if multiple PCEs support the TCP MD5 option, selecting a PCE with a highest priority to perform path computation, or if only one PCE supports the TCP MD5 option, determining that the PCE is used for path computation. Referring to FIG. 6, FIG. 6 is a flowchart of another method for advertising a transmission capability and determining a path computation element according to an embodiment of the present disclosure, where the method includes the following steps:

601. A router 1 generates a route advertisement message 1 and broadcasts the route advertisement message 1 within the area, where the route advertisement message 1 carries a PCE-ADDRESS sub-TLV and a PCE-CAP-FLAGS sub-TLV, the PCE-ADDRESS sub-TLV carries a location of the PCE1, and the PCE-CAP-FLAGS sub-TLV indicates that the PCE1 supports the TCP MD5.

602. The PCC receives the route advertisement message 1.

603. A router 2 generates a route advertisement message 2 and broadcasts the route advertisement message 2 within the area, where the route advertisement message 2 carries a PCE-ADDRESS sub-TLV and a PCE-CAP-FLAGS sub-TLV, the PCE-ADDRESS sub-TLV carries a location of the PCE2, and the PCE-CAP-FLAGS sub-TLV indicates that the PCE2 supports the TLS.

604. The PCC receives the route advertisement message 2.

605. A router 3 generates a route advertisement message 3 and broadcasts the route advertisement message 3 within the area, where the route advertisement message 3 carries a PCE-ADDRESS sub-TLV and a PCE-CAP-FLAGS sub-TLV, the PCE-ADDRESS sub-TLV carries a location of the PCE3, and the PCE-CAP-FLAGS sub-TLV indicates that the PCE3 supports the TLS and the TCP MD5.

606. The PCC receives the route advertisement message 3.

It should be noted that a time sequence of steps 601 and 602, steps 603 and 604, and steps 605 and 606 is not limited. Steps 605 and 606 may be performed before steps 601 and 602, or may be performed after steps 601 and 602 and before steps 603 and 604, and certainly, steps 601 and 602, steps 603 and 604, and steps 605 and 606 may be simultaneously performed.

607. The PCC determines, according to transmission capability information of the PCE1, transmission capability information of the PCE2, transmission capability information of the PCE3, and the preset selection policy, that the PCE1 is a PCE used for path computation.

The PCC supports the TCP AO and the TCP MD5 option, none of the PCE1, the PCE2, and the PCE3 supports the TCP AO, both the PCE1 and the PCE3 support the TCP MD5 option, and the priority of the PCE1 is higher than that of the PCE3; therefore, the PCC selects the PCE1 to perform path computation.

After selecting the PCE1, the PCC establishes a TLS connection with the PCE1, then establishes a PCEP session, submits a path computation request, and acquires a path computation result.

Figure 7:
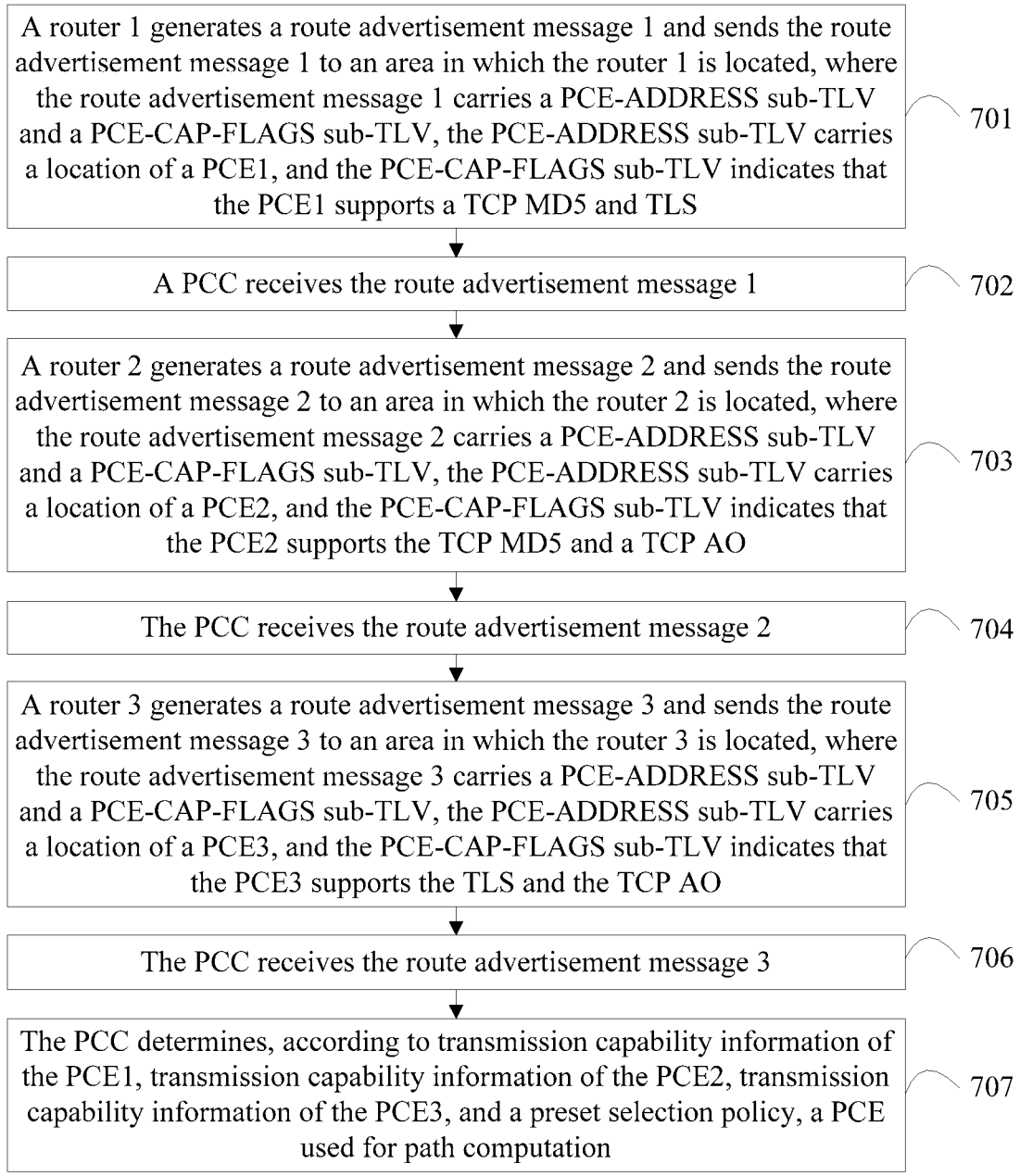
FIG. 7 is a flowchart of still another method for advertising a transmission capability and determining a path computation element according to an embodiment of the present disclosure.

It is assumed in an OSPF area, a PCC supports TLS and a TCP AO, a PCE1 supports a TCP MD5 and the TLS, a PCE2 supports the TCP MD5 and the TCP AO, and a PCE3 supports the TLS and the TCP AO. A preset selection policy includes: if the PCC supports the TLS and the TCP AO, determining, according to a security requirement, a PCE used for path computation. Referring to FIG. 7, FIG. 7 is a flowchart of still another method for advertising a transmission capability and determining a path computation element according to an embodiment of the present disclosure, where the method includes the following steps:

701. A router 1 generates a route advertisement message 1 and broadcasts the route advertisement message 1 within the area, where the route advertisement message 1 carries a PCE-ADDRESS sub-TLV and a PCE-CAP-FLAGS sub-TLV, the PCE-ADDRESS sub-TLV carries a location of the PCE1, and the PCE-CAP-FLAGS sub-TLV indicates that the PCE1 supports the TCP MD5 and the TLS.

702. The PCC receives the route advertisement message 1.

703. A router 2 generates a route advertisement message 2 and broadcasts the route advertisement message 2 within the area, where the route advertisement message 2 carries a PCE-ADDRESS sub-TLV and a PCE-CAP-FLAGS sub-TLV, the PCE-ADDRESS sub-TLV carries a location of the PCE2, and the PCE-CAP-FLAGS sub-TLV indicates that the PCE2 supports the TCP MD5 and the TCP AO.

704. The PCC receives the route advertisement message 2.

705. A router 3 generates a route advertisement message 3 and broadcasts the route advertisement message 3 within the area, where the route advertisement message 3 carries a PCE-ADDRESS sub-TLV and a PCE-CAP-FLAGS sub-TLV, the PCE-ADDRESS sub-TLV carries a location of the PCE3, and the PCE-CAP-FLAGS sub-TLV indicates that the PCE3 supports the TLS and the TCP AO.

706. The PCC receives the route advertisement message 3.

It should be noted that a time sequence of steps 701 and 702, steps 703 and 704, and steps 705 and 706 is not limited. Steps 705 and 706 may be performed before steps 701 and 702, or may be performed after steps 701 and 702 and before steps 703 and 704, and certainly, steps 701 and 702, steps 703 and 704, and steps 705 and 706 may be simultaneously performed.

707. The PCC determines, according to transmission capability information of the PCE1, transmission capability information of the PCE2, transmission capability information of the PCE3, and the preset selection policy, a PCE used for path computation.

If the security requirement is transport layer and sensitive data security, the PCC determines, according to the transmission capability information of the PCE1, the transmission capability information of the PCE2, the transmission capability information of the PCE3, and the preset selection policy, that the PCE3 is used for path computation. After selecting the PCE3, the PCC establishes a TLS and TCP AO connection with the PCE3, then establishes a PCEP session, that is, establishes PCEP over TLS and TCP AO, submits a path computation request, and acquires a path computation result.

If the security requirement is sensitive data security, the PCC determines, according to the transmission capability information of the PCE1, the transmission capability information of the PCE2, the transmission capability information of the PCE3, and the preset selection policy, that both the PCE1 and the PCE3 support the TLS, and the PCC determines, according to priorities of the PCE1 and the PCE3, that the PCE1 is used for path computation. After selecting the PCE1, the PCC establishes a TLS connection with the PCE1, then establishes a PCEP session, that is, establishes PCEP over TLS, submits a path computation request, and acquires a path computation result.

If the security requirement is transport layer security, the PCC determines, according to the transmission capability information of the PCE1, the transmission capability information of the PCE2, the transmission capability information of the PCE3, and the preset selection policy, that both the PCE2 and the PCE3 support the TCP AO, and the PCC determines, according to priorities of the PCE2 and the PCE3, that the PCE2 is used for path computation. After selecting the PCE2, the PCC establishes a TCP AO connection with the PCE2, then establishes a PCEP session, that is, establishes PCEP over TCP AO, submits a path computation request, and acquires a path computation result.

Figure 8:
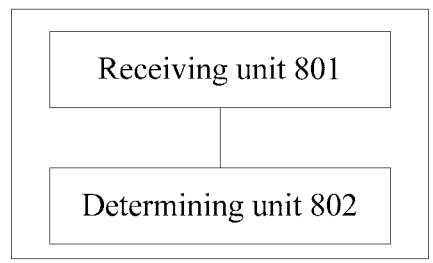
FIG. 8 is a structural block diagram of a communications device according to an embodiment of the present disclosure.

As shown in FIG. 8, FIG. 8 is a structural block diagram of a communications device according to an embodiment of the present disclosure. The communications device in this embodiment is a PCC network element and is configured to implement the method shown in FIG. 4 in the present disclosure. The communications device includes: a receiving unit 801 and a determining unit 802.

The receiving unit 801 is configured to receive at least one route advertisement message, where the route advertisement message includes location information and transmission capability information of a PCE, and the transmission capability information of the PCE includes a first flag bit, a second flag bit, and a third flag bit, where the first flag bit is used to indicate whether the PCE supports a Transmission Control Protocol TCP digest algorithm 5 option, the second flag bit is used to indicate whether the PCE supports a TCP authentication option AO, and the third flag bit is used to indicate whether the PCE supports Transport Layer Security TLS.

It may be understood that if the second flag bit indicates that the PCE supports the TCP AO and the third flag bit indicates that the PCE supports the TLS, the second flag bit and the third flag bit together indicate that the PCE supports the TLS and the TCP AO. Certainly, optionally, the transmission capability information of the PCE further includes a fourth flag bit, where the fourth flag bit is used to indicate whether the PCE supports the TLS and the TCP AO.

Optionally, when a flag bit is 0, it indicates not supporting; when a flag bit is 1, it indicates supporting. For example, in the route advertisement message, if the first flag bit is 1, it indicates that the PCE supports the TCP MD5; if the second flag bit is 0, it indicates that the PCE does not support the TCP AO; and if the third flag bit is 1, it indicates that the PCE supports the TLS.

Further, the route advertisement message may further include port information of the PCE, where the port information includes a port type and a port number. The port type includes a path computation protocol PCEP over TCP port, and a PCEP over TLS port; or the port type includes a PCEP over TCP digest algorithm 5 option port, a PCEP over TCP AO port, and a PCEP over TLS port, and optionally, further includes a PCEP over TLS and TCP AO port.

The determining unit 802 is configured to determine, according to a preset selection policy and the transmission capability information of the PCE in the at least one route advertisement message, a PCE used for path computation.

The route advertisement message may be an IGP route advertisement message (specifically, reference may be made to the method shown in FIG. 1 in the present disclosure) or a BGP route advertisement message (specifically, reference may be made to the method shown in FIG. 3 in the present disclosure), where the IGP route advertisement message may be an OSPF LSA or an IS-IS LSA. In specific implementation, the location information of the PCE, such as an IPv4 address or an IPv6 address, may be carried in a PCE-ADDRESS sub-TLV of a PCED TLV in the OSPF LSA or of a PCED sub-TLV in the IS-IS LSA. By extending a PCED TLV in the OSPF protocol or a PCED sub-TLV in the IS-IS protocol, the transmission capability information of the PCE may be used to respectively define three currently unused flag bits in a PCE-CAP-FLAGS sub-TLV as the foregoing first flag bit, second flag bit, and third flag bit; further, the fourth flag bit may be further defined. A specific format of the PCED TLV in the OSPF protocol or the PCED sub-TLV in the IS-IS protocol may be shown in FIG. 2a. A correspondence between four extended flag bits in the PCE-ADDRESS sub-TLV in FIG. 2a and PCE capability descriptions may be as follows:

| Flag Bit (bits) | Capability Description (capability description) |
|---|---|
| 12 | Indicating whether to support a TCP MD5 (PCEP over TCP MD5) |
| 13 | Indicating whether to support a TCP AO (PCEP over TCP AO) |
| 14 | Indicating whether to support TLS (PCEP over TLS) |
| 15 | Indicating whether to support TLS and a TCP AO (PCEP over TLS and TCP AO) |

It should be noted that in FIG. 2a, defining of the four flag bits, namely, 12, 13, 14, and 15 is used as an example, and the foregoing capability descriptions corresponding to all flag bits are also used merely as an example, and constitute no limitation to the present disclosure.

Further, the IGP route advertisement message may further include the port information of the PCE, the PCED TLV in the OSPF protocol or the PCED sub-TLV in the IS-IS protocol may be extended, a sub-TLV that carries the port information of the PCE is defined, and a format may be shown in FIG. 2b. The port information of the PCE may be carried in two implementation manners:

In one manner, two sub-TLVs are defined to carry the port information of the PCE, where one sub-TLV carries a PCEP over TCP port, and the other sub-TLV carries a PCEP over TLS port. A PCE that supports the TCP MD5 option and a PCE that supports the TCP AO share the sub-TLV that carries the PCEP over TCP port, and a PCE that supports the TLS uses the sub-TLV of the PCEP over TLS port. Optionally, if the transmission capability information of the PCE further includes the fourth flag bit, a PCE that supports the TLS and a PCE that supports the TLS and the TCP AO share the sub-TLV of the PCEP over TLS port.

In the other manner, three sub-TLVs are defined to respectively carry a PCEP over TCP MD5 option port, a PCEP over TCP AO port, and a PCEP over TLS port. Further, if the transmission capability information of the PCE further includes the fourth flag bit, a sub-TLV may be further defined to carry a PCEP over TLS and TCP AO port.

The BGP route advertisement message includes the location information and the transmission capability information of the PCE, which can be implemented by extending the BGP protocol. For example, a PCE-ADDRESS sub-TLV and a PCE-CAP-FLAGS sub-TLV are defined in an NLRI TLV in the BGP protocol and are carried in the BGP route advertisement message, where the PCE-ADDRESS sub-TLV is used to carry the location information of the PCE, and the PCE-CAP-FLAGS sub-TLV is used to carry the transmission capability information of the PCE. A specific format may be the same as the extended PCED TLV in the OSPF protocol or the extended PCED sub-TLV in the IS-IS protocol, as shown in FIG. 2a.

Further, the BGP route advertisement message may further include the port information of the PCE, where the port information includes a port type and a port number. Corresponding to the IGP route advertisement message, the port type includes a PCEP over TCP port, and a PCEP over TLS port; or the port type includes a PCEP over TCP MD5 port, a PCEP over TCP AO port, and a PCEP over TLS port, and further, may further include a PCEP over TLS and TCP AO port. In specific implementation, the BGP protocol may be extended. For example, the sub-TLV that carries the port information of the PCE is defined in NLRI, and a format may be shown in FIG. 2b. Corresponding to extension of the OSPF protocol or the IS-IS protocol, the port information of the PCE may also be carried in two implementation manners:

In one manner, two sub-TLVs are defined to carry the port information of the PCE, where one sub-TLV carries a PCEP over TCP port, and the other sub-TLV carries a PCEP over TLS port. A PCE that supports the TCP MD5 option and a PCE that supports the TCP AO share the sub-TLV that carries the PCEP over TCP port, and a PCE that supports the TLS uses the sub-TLV of the PCEP over TLS port. Optionally, if the transmission capability information of the PCE further includes the fourth flag bit, a PCE that supports the TLS and a PCE that supports the TLS and the TCP AO share the sub-TLV of the PCEP over TLS port.

In the other manner, three sub-TLVs are defined to respectively carry a PCEP over TCP MD5 option port, a PCEP over TCP AO port, and a PCEP over TLS port. Further, if the transmission capability information of the PCE further includes the fourth flag bit, a sub-TLV may be further defined to carry a PCEP over TLS and TCP AO port.

It may be understood that in this embodiment of the present disclosure, the route advertisement message may include location information and transmission capability information of only one PCE, or may include location information and transmission capability information of multiple PCEs. The PCC may determine, according to transmission capability information of one or more PCEs in one route advertisement message, or according to transmission capability information of all PCEs in multiple route advertisement messages, a PCE used for path computation.

The preset selection policy includes:

selecting a PCE that has a transmission capability supported by the PCC, to perform path computation.

If the PCC supports both the TCP AO and the TCP MD5 option, a PCE that supports the TCP AO is preferentially selected to perform path computation, and if no PCE supports the TCP AO, a PCE that supports the TCP MD5 is selected to perform path computation.

If the PCC supports the TLS and the TCP AO, a PCE used for path computation is determined according to a security requirement, where the security requirement includes: transport layer security, sensitive data security, and transport layer and sensitive data security. If the PCC supports the TLS and the TCP AO, when the security requirement is the transport layer and sensitive data security, a PCE that supports the TLS and the TCP AO is selected to perform path computation, or when the security requirement is the transport layer security, a PCE that supports the TCP AO is selected to perform path computation, or when the security requirement is the sensitive data security, a PCE that supports the TLS is selected to perform path computation.

Further, with reference to a priority of a PCE or load information of a PCE or a preference of the PCC, a PCE may be determined to perform path computation, and the preset selection policy includes:

selecting, with reference to the priority of the PCE or the load information of the PCE or the preference of the PCC, a PCE that has a transmission capability supported by the PCC, to perform path computation. For example, with reference to the priority of the PCE, the preset selection policy includes: if only one PCE has the transmission capability supported by the PCC, selecting the PCE to perform path computation; or if multiple PCEs have the transmission capability supported by the PCC, selecting a PCE with a highest priority in the multiple PCEs to perform path computation.

If the PCC supports both the TCP AO and the TCP MD5 option, a PCE that supports the TCP AO is preferentially selected with reference to the priority of the PCE or the load information of the PCE or the preference of the PCC, to perform path computation, and if no PCE supports the TCP AO, a PCE that supports the TCP MD5 is selected with reference to the priority of the PCE or the load information of the PCE or the preference of the PCC, to perform path computation. For example, with reference to the priority of the PCE, if the PCC supports both the TCP AO and the TCP MD5 option, and if multiple PCEs support the TCP AO, a PCE with a highest priority is selected to perform path computation, or if only one PCE supports the TCP AO, it is determined that the PCE is used for path computation; if no PCE supports the TCP AO, and if multiple PCEs support the TCP MD5 option, a PCE with a highest priority is selected to perform path computation, or if only one PCE supports the TCP MD5 option, it is determined that the PCE is used for path computation.

If the PCC supports the TLS and the TCP AO, a PCE used for path computation is determined according to the security requirement and with reference to the priority of the PCE or the load information of the PCE or the preference of the PCC. If the PCC supports the TLS and the TCP AO, and when multiple PCEs meet the security requirement, a PCE with a highest priority may be selected according to priorities of the multiple PCEs or load information of the PCEs or the preference of the PCC, to perform path computation, or when only one PCE meets the security requirement, it is determined that the PCE is used for path computation.

In specific implementation, with reference to the current standard specification, priority information of the PCE may be carried in the PCED TLV in the OSPF protocol or in the PCED sub-TLV in the IS-IS protocol.

Optionally, the load information of the PCE includes a load capability, a current load status, and the like of the PCE. When a PCE used for path computation is selected with reference to the load information of the PCE, for example, a PCE that has a strong load capability and whose current load is relatively light may be selected to perform path computation. Certainly, the preset selection policy may also be combined with a local policy of the PCC. For example, the local policy is to select a PCE that supports maximum transmission capabilities. Certainly, the local policy of the PCC may be statically configured, or may be dynamically adjusted according to a requirement.

It should be noted that, after the PCC selects the PCE according to the technical solution of the present disclosure, for establishing a PCEP session with the PCE, submitting a path computation request, acquiring a path computation result, and the like, reference may be made to the current standard specification, and details are not described herein again in this embodiment of the present disclosure.

The PCC provided in this embodiment of the present disclosure receives a route advertisement message that carries transmission capability information of a PCE, and selects, according to a transmission capability of the PCE and a preset selection policy, a PCE that matches a transmission capability of the PCC, to perform path computation, which can improve a success rate of establishing a PCEP session between the PCC and the PCE, and can improve efficiency of path computation.

Figure 9:
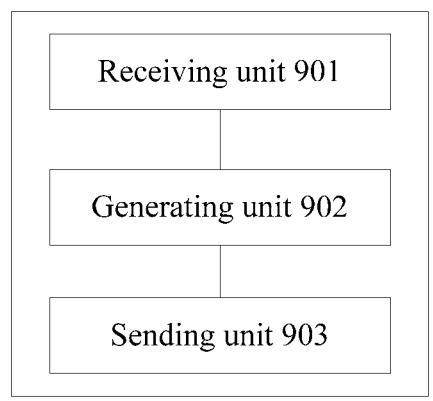
FIG. 9 is a structural block diagram of another communications device according to an embodiment of the present disclosure.

As shown in FIG. 9, FIG. 9 is a structural block diagram of another communications device according to an embodiment of the present disclosure. The communications device in this embodiment is a BGP router and is configured to implement the method shown in FIG. 3 in the present disclosure. The communications device includes: a receiving unit 901, a generating unit 902, and a sending unit 903.

The receiving unit 901 is configured to receive at least one IGP route advertisement message from an autonomous system AS domain, where the IGP route advertisement message includes location information and transmission capability information of a path computation element PCE, and the transmission capability information of the PCE includes a first flag bit, a second flag bit, and a third flag bit, where the first flag bit is used to indicate whether the PCE supports a Transmission Control Protocol TCP digest algorithm 5 option, the second flag bit is used to indicate whether the PCE supports a TCP authentication option AO, and the third flag bit is used to indicate whether the PCE supports Transport Layer Security TLS. Optionally, the transmission capability information of the PCE further includes a fourth flag bit, where the fourth flag bit is used to indicate whether the PCE supports the TLS and the TCP AO.

The IGP route advertisement message is an OSPF LSA or an IS-IS LSA.

The BGP router may be a BGP speaker.

In specific implementation, by extending a PCE-CAP-FLAGS sub-TLV of a PCED TLV in the OSPF protocol or of a PCED sub-TLV in the IS-IS protocol, the transmission capability information of the PCE may be used to define three currently unused flag bits in the PCE-CAP-FLAGS sub-TLV as the foregoing first flag bit, second flag bit, and third flag bit, which are respectively used to indicate whether the PCE supports the TCP MD5 option, whether the PCE supports the TCP AO, and whether the PCE supports the TLS. Further, the fourth flag bit may be further defined and is used to indicate whether the PCE supports the TLS and the TCP AO.

A format of the PCED TLV in the OSPF protocol or the PCED sub-TLV in the IS-IS protocol may be shown in FIG. 2a. A correspondence between four extended flag bits in the PCE-ADDRESS sub-TLV in FIG. 2a and PCE capability descriptions may be as follows:

| Flag Bit (bits) | Capability Description (capability description) |
|---|---|
| 12 | Indicating whether to support a TCP MD5 (PCEP over TCP MD5) |
| 13 | Indicating whether to support a TCP AO (PCEP over TCP AO) |
| 14 | Indicating whether to support TLS (PCEP over TLS) |
| 15 | Indicating whether to support TLS and a TCP AO (PCEP over TLS and TCP AO) |

It should be noted that in FIG. 2a, defining of the four flag bits, namely, 12, 13, 14, and 15 is used as an example, and the foregoing flag bits and the corresponding capability descriptions are also used merely as an example, and constitute no limitation to the present disclosure.

The generating unit 902 is configured to generate a Border Gateway Protocol (BGP) route advertisement message according to the at least one IGP route advertisement message, where the BGP route advertisement message includes the location information and the transmission capability information of the PCE in the at least one IGP route advertisement message.

For example, it is assumed that the communications device receives two IGP route advertisement messages: a first IGP route advertisement message and a second IGP route advertisement message, where the first IGP route advertisement message includes location information and transmission capability information of a first PCE, the second route advertisement message includes location information and transmission capability information of a second PCE, and the first IGP route advertisement message and the second IGP route advertisement message come from an AS domain. The communications device generates the BGP route advertisement message according to the first route advertisement message and the second route advertisement message, where the BGP route advertisement message includes the location information and the transmission capability information of the first PCE and the location information and the transmission capability information of the second PCE.

In this embodiment of the present disclosure, the communications device may generate a BGP route advertisement message according to only one IGP route advertisement message, or may generate a BGP route advertisement message according to multiple IGP route advertisement messages received from an AS domain, and send, to another AS domain by using the BGP route advertisement message, location information and transmission capability information of all PCEs carried in the multiple IGP route advertisement messages.

In specific implementation, the BGP protocol may be extended. For example, the PCE-ADDRESS sub-TLV and the PCE-CAP-FLAGS sub-TLV are defined in an NLRI TLV and are carried in the BGP route advertisement message. Optionally, by extending a capability optional parameter in the BGP protocol, the transmission capability information of the PCE may also be used to define a currently unused capability code, where the code is used to identify a transmission capability of the PCE. For extension of the BGP protocol, reference may be made to the method shown in FIG. 3 in the present disclosure, and details are not described herein again.

The sending unit 903 is configured to send the BGP route advertisement message to an autonomous system AS domain other than the AS.

Assuming that the at least one IGP route advertisement message comes from a first AS domain and the BGP router is located on a border between the first AS and a second AS, the sending unit 903 sends the BGP route advertisement message to the second AS to advertise the transmission capability of the PCE to a member within the second AS.

Further, the IGP route advertisement message may further include port information of the PCE, where the port information includes a port type and a port number. The port type includes a PCEP over TCP port, and a PCEP over TLS port; or the port type includes: a PCEP over TCP MD5 option port, a PCEP over TCP AO port, and a PCEP over TLS port, and further, may further include a PCEP over TLS and TCP AO port. In specific implementation, the PCED TLV in the OSPF protocol or the PCED sub-TLV in the IS-IS protocol may be extended, a sub-TLV that carries the port information of the PCE is defined, and a format may be shown in FIG. 2b. Specifically, reference may be made to the method shown in FIG. 1 in the present disclosure, and details are not described herein again.

Accordingly, the BGP route advertisement message may further include the port information of the PCE. In specific implementation, the BGP protocol may be extended. For example, the sub-TLV that carries the port information of the PCE is defined in NLRI, and a format may be shown in FIG. 2b. Being similar to extension of the OSPF protocol or the IS-IS protocol, the port information of the PCE may also be carried in two implementation manners:

In one manner, two sub-TLVs are defined to carry the port information of the PCE, where one sub-TLV carries a PCEP over TCP port, and the other sub-TLV carries a PCEP over TLS port. A PCE that supports the TCP MD5 option and a PCE that supports the TCP AO share the sub-TLV that carries the PCEP over TCP port, and a PCE that supports the TLS uses the sub-TLV of the PCEP over TLS port. Optionally, if the transmission capability information of the PCE further includes the fourth flag bit, a PCE that supports the TLS and a PCE that supports the TLS and the TCP AO share the sub-TLV of the PCEP over TLS port.

In the other manner, three sub-TLVs are defined to respectively carry a PCEP over TCP MD5 option port, a PCEP over TCP AO port, and a PCEP over TLS port. Further, if the transmission capability information of the PCE further includes the fourth flag bit, a sub-TLV may be further defined to carry a PCEP over TLS and TCP AO port.

Optionally, the communications device further includes a check unit, configured to: after the receiving unit 901 receives the IGP route advertisement message and before the generating unit 902 generates the BGP route advertisement message, check whether the IGP route advertisement message includes the transmission capability information of the PCE. If the check unit determines that the IGP route advertisement message includes the transmission capability information of the PCE, the generating unit 902 generates the BGP route advertisement message that includes the location information and the transmission capability information of the PCE; or if the check unit determines that the IGP route advertisement message does not include the transmission capability information of the PCE, the communications device performs processing according to the current standard specification.

It may be understood that the IGP route advertisement message may include location information and transmission capability information of only one PCE, or may include location information and transmission capability information of multiple PCEs. Accordingly, the BGP route advertisement message includes the location information and the transmission capability information of the multiple PCEs in the IGP route advertisement message.

The communications device provided in this embodiment of the present disclosure implements advertisement of a PCE transmission capability between ASs by using an extended BGP protocol, which can ensure that a PCEP session is effectively established between a PCC and a PCE in inter-ASs, and can improve efficiency and a success rate of path computation between the PCC and the PCE.

Figure 10:
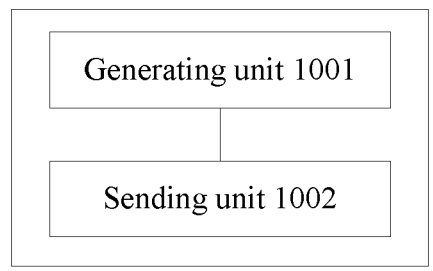
FIG. 10 is a structural block diagram of still another communications device according to an embodiment of the present disclosure.

As shown in FIG. 10, FIG. 10 is a structural block diagram of still another communications device according to an embodiment of the present disclosure. The communications device in this embodiment is an IGP router and is configured to implement the method shown in FIG. 1 in the present disclosure. The communications device includes: a generating unit 1001 and a sending unit 1002.

The generating unit 1001 is configured to generate an IGP route advertisement message, where the route advertisement message includes location information and transmission capability information of a first PCE, and the transmission capability information of the first PCE includes a first flag bit, a second flag bit, and a third flag bit, where the first flag bit is used to indicate whether the first PCE supports a Transmission Control Protocol TCP message-digest algorithm 5 MD5 option, the second flag bit is used to indicate whether the first PCE supports a TCP authentication option AO, and the third flag bit is used to indicate whether the first PCE supports Transport Layer Security TLS.

It may be understood that if the second flag bit indicates that the first PCE supports the TCP AO and the third flag bit indicates that the first PCE supports the TLS, the second flag bit and the third flag bit together indicate that the first PCE supports the TLS and the TCP AO. Certainly, optionally, the transmission capability information of the first PCE further includes a fourth flag bit, where the fourth flag bit is used to indicate whether the first PCE supports the TLS and the TCP AO.

The sending unit 1002 is configured to send the IGP route advertisement message to an area in which the communications device is located, which generally may also mean that the IGP route advertisement message is flooded, so as to advertise a transmission capability of the first PCE to a member within the area in which the communications device is located.

Further, the route advertisement message may further include port information of the first PCE, where the port information includes a port type and a port number. The port type includes a PCEP over TCP port, and a PCEP over TLS port; or the port type includes a PCEP over TCP MD5 option port, a PCEP over TCP AO port, and a PCEP over TLS port. Further, optionally, if the transmission capability information of the first PCE further includes the fourth flag bit, accordingly, the port type includes a PCEP over TLS and TCP AO port.

IGP includes OSPF and IS-IS. Accordingly, the communications device is an OSPF router, the area in which the communications device is located is an OSPF area, and the route advertisement message is an OSPF LSA; or the communications device is an IS-IS router, the area in which the communications device is located is an IS-IS area, and the route advertisement message is an IS-IS LSA.

In specific implementation, the location information of the first PCE, such as an IPv4 address or an IPv6 address, may be carried in a PCE-ADDRESS sub-TLV of a PCED TLV in the OSPF protocol or of a PCED sub-TLV in the IS-IS protocol. By extending the PCED TLV in the OSPF protocol or the PCED sub-TLV in the IS-IS protocol, three currently unused flag bits are defined in a PCE-CAP-FLAGS sub-TLV as the foregoing first flag bit, second flag bit, and third flag bit, which are respectively used to indicate whether the first PCE supports the TCP MD5 option, whether the first PCE supports the TCP AO, and whether the first PCE supports the TLS. Further, the fourth flag bit may be further defined and is used to indicate whether the first PCE supports the TLS and the TCP AO.

A format of the PCED TLV in the OSPF protocol or the PCED sub-TLV in the IS-IS protocol may be shown in FIG. 2a. A correspondence between four extended flag bits in the PCE-ADDRESS sub-TLV in FIG. 2a and PCE capability descriptions may be as follows:

| Flag Bit (bits) | Capability Description (capability description) |
|---|---|
| 12 | Indicating whether to support a TCP MD5 (PCEP over TCP MD5) |
| 13 | Indicating whether to support a TCP AO (PCEP over TCP AO) |
| 14 | Indicating whether to support TLS (PCEP over TLS) |
| 15 | Indicating whether to support TLS and a TCP AO (PCEP over TLS and TCP AO) |

It should be noted that in FIG. 2a, defining of the four flag bits, namely, 12, 13, 14, and 15 is used as an example, and the foregoing flag bits and the corresponding capability descriptions are also used merely as an example, and constitute no limitation to the present disclosure.

Further, the PCED TLV in the OSPF protocol or the PCED sub-TLV in the IS-IS protocol may be further extended, a sub-TLV that carries the port information of the first PCE is defined, and a format may be shown in FIG. 2b. The port information of the first PCE may be carried in two implementation manners:

In one manner, two sub-TLVs are defined to carry the port information of the PCE, where one sub-TLV carries a PCEP over TCP port, and the other sub-TLV carries a PCEP over TLS port. A PCE that supports the TCP MD5 option and a PCE that supports the TCP AO share the sub-TLV that carries the PCEP over TCP port, and a PCE that supports the TLS uses the sub-TLV of the PCEP over TLS port. Optionally, if the transmission capability information of the first PCE further includes the fourth flag bit, a PCE that supports the TLS and a PCE that supports the TLS and the TCP AO share the sub-TLV of the PCEP over TLS port.

In the other manner, three sub-TLVs are defined to respectively carry a PCEP over TCP MD5 option port, a PCEP over TCP AO port, and a PCEP over TLS port. Further, if the transmission capability information of the first PCE further includes the fourth flag bit, a sub-TLV may be further defined to carry a PCEP over TLS and TCP AO port.

Further, the communications device may further include a receiving unit, configured to receive registration information of the first PCE before the route advertisement message is generated, where the registration information includes the transmission capability of the first PCE. The registration information may further include a path computation scope, a neighbor PCE, a communication capability, a path computation capability, and the like of the first PCE.

Further, the route advertisement message may further include location information and transmission capability information of a second PCE, and optionally, further includes port information of the second PCE. Accordingly, the receiving unit is further configured to receive registration information of the second PCE before the route advertisement message is generated, where the registration information includes a transmission capability of the second PCE.

According to the communications device provided in this embodiment of the present disclosure, a PCED TLV in the OSPF protocol or a PCED sub-TLV in the IS-IS protocol is extended, and a flag bit is defined to indicate a transmission capability of a PCE, so that advertisement of the transmission capability of the PCE can be implemented, and a PCC can select a PCE that matches a transmission capability of the PCC, which ensures that a PCEP session is effectively established between the PCC and the PCE, and improves efficiency and a success rate of path computation between the PCC and the PCE.

Figure 11:
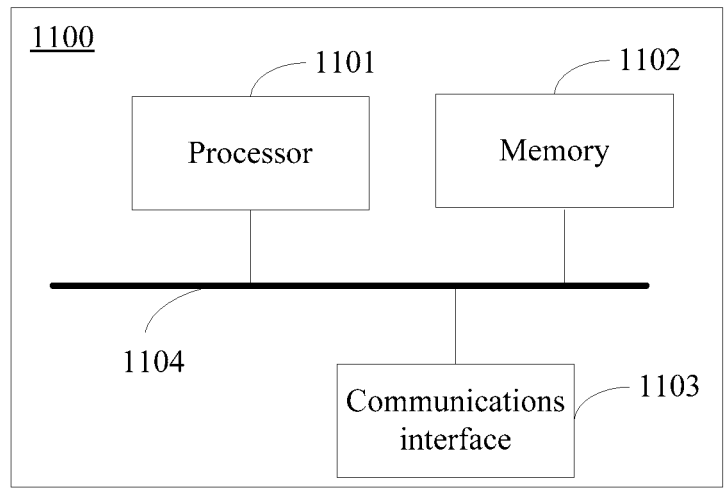
FIG. 11 is a schematic structural diagram of a communications device according to an embodiment of the present disclosure.

As shown in FIG. 11, FIG. 11 is a schematic structural diagram of a communications device 1100 according to an embodiment of the present disclosure. The communications device in this embodiment is a PCC network element and is configured to implement the method shown in FIG. 4 in the present disclosure. The communications device 1100 includes: a processor 1101, a memory 1102, a communications interface 1103, and a bus 1104.

The processor 1101, the memory 1102, and the communications interface 1103 are connected to each other by using the bus 1104. The bus 1104 may be a peripheral component interconnect (PCI) bus, an Extended Industry Standard Architecture (EISA) bus, or the like. The bus may be classified into an address bus, a data bus, a control bus, and the like. For convenience of representation, the bus is represented by using only one thick line in FIG. 11; however, it does not indicate that there is only one bus or only one type of bus.

The memory 1102 is configured to store a program. The program may include program code, where the program code includes a computer operation instruction. The memory 1102 may include a high-speed random access memory (RAM), or may include a non-volatile memory, for example, at least one disk memory.

The communications interface 1103 is configured to communicate with another communications device.

The processor 1101 executes the program stored by the memory 1102 and executes a method for determining a path computation element according to this embodiment of the present disclosure, where the method includes:

receiving at least one route advertisement message, where the route advertisement message includes location information and transmission capability information of a PCE, and the transmission capability information of the PCE includes a first flag bit, a second flag bit, and a third flag bit, where the first flag bit is used to indicate whether the PCE supports a Transmission Control Protocol TCP digest algorithm 5 option, the second flag bit is used to indicate whether the PCE supports a TCP authentication option AO, and the third flag bit is used to indicate whether the PCE supports Transport Layer Security TLS; optionally, the transmission capability information of the PCE further includes a fourth flag bit, where the fourth flag bit is used to indicate whether the PCE supports the TLS and the TCP AO; and determining, according to a preset selection policy and the transmission capability information of the PCE in the at least one route advertisement message, a PCE used for path computation.

Further, the route advertisement message may further include port information of the PCE, where the port information includes a port type and a port number. The port type includes a path computation protocol PCEP over TCP port, and a PCEP over TLS port; or the port type includes a PCEP over TCP digest algorithm 5 option port, a PCEP over TCP AO port, and a PCEP over TLS port, and optionally, further includes a PCEP over TLS and TCP AO port.

The route advertisement message may be an IGP route advertisement message (specifically, reference may be made to the method shown in FIG. 1 in the present disclosure) or a BGP route advertisement message (specifically, reference may be made to the method shown in FIG. 3 in the present disclosure), where the IGP route advertisement message may be an OSPF LSA or an IS-IS LSA. In specific implementation, the location information of the PCE, such as an IPv4 address or an IPv6 address, may be carried in a PCE-ADDRESS sub-TLV of a PCED TLV in the OSPF LSA or of a PCED sub-TLV in the IS-IS LSA. By extending a PCED TLV in the OSPF protocol or a PCED sub-TLV in the IS-IS protocol, the transmission capability information of the PCE may be used to respectively define three currently unused flag bits in a PCE-CAP-FLAGS sub-TLV as the foregoing first flag bit, second flag bit, and third flag bit; further, the fourth flag bit may be further defined. A specific format of the PCED TLV in the OSPF protocol or the PCED sub-TLV in the IS-IS protocol may be shown in FIG. 2a. A correspondence between four extended flag bits in the PCE-ADDRESS sub-TLV in FIG. 2a and PCE capability descriptions may be as follows:

| Flag Bit (bits) | Capability Description (capability description) |
|---|---|
| 12 | Indicating whether to support a TCP MD5 (PCEP over TCP MD5) |
| 13 | Indicating whether to support a TCP AO (PCEP over TCP AO) |
| 14 | Indicating whether to support TLS (PCEP over TLS) |
| 15 | Indicating whether to support TLS and a TCP AO (PCEP over TLS and TCP AO) |

It should be noted that in FIG. 2a, defining of the four flag bits, namely, 12, 13, 14, and 15 is used as an example, and the foregoing capability descriptions corresponding to all flag bits are also used merely as an example, and constitute no limitation to the present disclosure.

Further, the IGP route advertisement message may further include the port information of the PCE, the PCED TLV in the OSPF protocol or the PCED sub-TLV in the IS-IS protocol may be extended, a sub-TLV that carries the port information of the PCE is defined, and a format may be shown in FIG. 2b. The port information of the PCE may be carried in two implementation manners:

In one manner, two sub-TLVs are defined to carry the port information of the PCE, where one sub-TLV carries a PCEP over TCP port, and the other sub-TLV carries a PCEP over TLS port. A PCE that supports the TCP MD5 option and a PCE that supports the TCP AO share the sub-TLV that carries the PCEP over TCP port, and a PCE that supports the TLS uses the sub-TLV of the PCEP over TLS port. Optionally, if the transmission capability information of the PCE further includes the fourth flag bit, a PCE that supports the TLS and a PCE that supports the TLS and the TCP AO share the sub-TLV of the PCEP over TLS port.

In the other manner, three sub-TLVs are defined to respectively carry a PCEP over TCP MD5 option port, a PCEP over TCP AO port, and a PCEP over TLS port. Further, if the transmission capability information of the PCE further includes the fourth flag bit, a sub-TLV may be further defined to carry a PCEP over TLS and TCP AO port.

The BGP route advertisement message includes the location information and the transmission capability information of the PCE, which can be implemented by extending the BGP protocol. For example, a PCE-ADDRESS sub-TLV and a PCE-CAP-FLAGS sub-TLV are defined in an NLRI TLV in the BGP protocol and are carried in the BGP route advertisement message, where the PCE-ADDRESS sub-TLV is used to carry the location information of the PCE, and the PCE-CAP-FLAGS sub-TLV is used to carry the transmission capability information of the PCE. A specific format may be the same as the extended PCED TLV in the OSPF protocol or the extended PCED sub-TLV in the IS-IS protocol, as shown in FIG. 2a. Further, the BGP route advertisement message may further include the port information of the PCE, where the port information includes a port type and a port number. Corresponding to the IGP route advertisement message, the port type includes a PCEP over TCP port, and a PCEP over TLS port; or the port type includes a PCEP over TCP MD5 port, a PCEP over TCP AO port, and a PCEP over TLS port, and further, may further include a PCEP over TLS and TCP AO port. In specific implementation, the BGP protocol may be extended. For example, the sub-TLV that carries the port information of the PCE is defined in NLRI, and a format may be shown in FIG. 2b. Corresponding to extension of the OSPF protocol or the IS-IS protocol, the port information of the PCE may also be carried in the foregoing two implementation manners.

It may be understood that in this embodiment of the present disclosure, the route advertisement message may include location information and transmission capability information of only one PCE, or may include location information and transmission capability information of multiple PCEs. The PCC may determine, according to transmission capability information of one or more PCEs in one route advertisement message, or according to transmission capability information of all PCEs in multiple route advertisement messages, a PCE used for path computation.

The preset selection policy includes:

selecting a PCE that has a transmission capability supported by the PCC, to perform path computation.

If the PCC supports both the TCP AO and the TCP MD5 option, a PCE that supports the TCP AO is preferentially selected to perform path computation, and if no PCE supports the TCP AO, a PCE that supports the TCP MD5 is selected to perform path computation.

If the PCC supports the TLS and the TCP AO, a PCE used for path computation is determined according to a security requirement, where the security requirement includes: transport layer security, sensitive data security, and transport layer and sensitive data security. If the PCC supports the TLS and the TCP AO, when the security requirement is the transport layer and sensitive data security, a PCE that supports the TLS and the TCP AO is selected to perform path computation, or when the security requirement is the transport layer security, a PCE that supports the TCP AO is selected to perform path computation, or when the security requirement is the sensitive data security, a PCE that supports the TLS is selected to perform path computation.

Further, with reference to a priority of a PCE or load information of a PCE or a preference of the PCC, a PCE may be determined to perform path computation, and the preset selection policy includes:

selecting, with reference to the priority of the PCE or the load information of the PCE or the preference of the PCC, a PCE that has a transmission capability supported by the PCC, to perform path computation. For example, with reference to the priority of the PCE, the preset selection policy includes: if only one PCE has the transmission capability supported by the PCC, selecting the PCE to perform path computation; or if multiple PCEs have the transmission capability supported by the PCC, selecting a PCE with a highest priority in the multiple PCEs to perform path computation.

If the PCC supports both the TCP AO and the TCP MD5 option, a PCE that supports the TCP AO is preferentially selected with reference to the priority of the PCE or the load information of the PCE or the preference of the PCC, to perform path computation, and if no PCE supports the TCP AO, a PCE that supports the TCP MD5 is selected with reference to the priority of the PCE or the load information of the PCE or the preference of the PCC, to perform path computation. For example, with reference to the priority of the PCE, if the PCC supports both the TCP AO and the TCP MD5 option, and if multiple PCEs support the TCP AO, a PCE with a highest priority is selected to perform path computation, or if only one PCE supports the TCP AO, it is determined that the PCE is used for path computation; if no PCE supports the TCP AO, and if multiple PCEs support the TCP MD5 option, a PCE with a highest priority is selected to perform path computation, or if only one PCE supports the TCP MD5 option, it is determined that the PCE is used for path computation.

If the PCC supports the TLS and the TCP AO, a PCE used for path computation is determined according to the security requirement and with reference to the priority of the PCE or the load information of the PCE or the preference of the PCC. If the PCC supports the TLS and the TCP AO, and when multiple PCEs meet the security requirement, a PCE with a highest priority may be selected according to priorities of the multiple PCEs or load information of the PCEs or the preference of the PCC, to perform path computation, or when only one PCE meets the security requirement, it is determined that the PCE is used for path computation.

Optionally, the memory 1102 is further configured to save the preset selection policy.

In specific implementation, with reference to the current standard specification, priority information of the PCE may be carried in the PCED TLV in the OSPF protocol or in the PCED sub-TLV in the IS-IS protocol.

Optionally, the load information of the PCE includes a load capability, a current load status, and the like of the PCE. When a PCE used for path computation is selected with reference to the load information of the PCE, for example, a PCE that has a strong load capability and whose current load is relatively light may be selected to perform path computation. Certainly, the preset selection policy may also be combined with a local policy of the PCC. For example, the local policy is to select a PCE that supports maximum transmission capabilities. Certainly, the local policy of the PCC may be statically configured, or may be dynamically adjusted according to a requirement.

It should be noted that, after the PCC selects the PCE according to the technical solution of the present disclosure, for establishing a PCEP session with the PCE, submitting a path computation request, acquiring a path computation result, and the like, reference may be made to the current standard specification, and details are not described herein again in this embodiment of the present disclosure.

The PCC provided in this embodiment of the present disclosure receives a route advertisement message that carries transmission capability information of a PCE, and selects, according to a transmission capability of the PCE and a preset selection policy, a PCE that matches a transmission capability of the PCC, to perform path computation, which can improve a success rate of establishing a PCEP session between the PCC and the PCE, and can improve efficiency of path computation.

Figure 12:
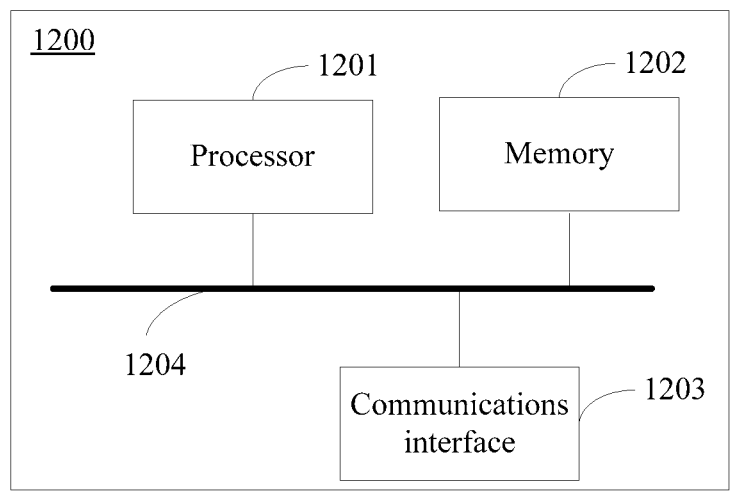
FIG. 12 is a schematic structural diagram of another communications device according to an embodiment of the present disclosure.

As shown in FIG. 12, FIG. 12 is a schematic structural diagram of another communications device 1200 according to an embodiment of the present disclosure. The communications device in this embodiment is a BGP router and is configured to implement the method shown in FIG. 3 in the present disclosure. The communications device 1200 includes: a processor 1201, a memory 1202, a communications interface 1203, and a bus 1204.

The processor 1201, the memory 1202, and the communications interface 1203 are connected to each other by using the bus 1204, and the bus 1204 may be a PCI bus, an EISA bus, or the like. The bus may be classified into an address bus, a data bus, a control bus, and the like. For convenience of representation, the bus is represented by using only one thick line in FIG. 12; however, it does not indicate that there is only one bus or only one type of bus.

The communications interface 1203 is configured to communicate with another communications device.

The memory 1202 is configured to store a program. The program may include program code, where the program code includes a computer operation instruction. The memory 1202 may include a high speed RAM, or may include a non-volatile memory, for example, at least one magnetic disk memory.

The processor 1201 executes the program stored by the memory 1202 and executes a method for advertising a transmission capability according to this embodiment of the present disclosure, where the method includes:

receiving at least one IGP route advertisement message from an AS domain, where the IGP route advertisement message includes location information and transmission capability information of a path computation element PCE, and the transmission capability information of the PCE includes a first flag bit, a second flag bit, and a third flag bit, where the first flag bit is used to indicate whether the PCE supports a Transmission Control Protocol TCP digest algorithm 5 option, the second flag bit is used to indicate whether the PCE supports a TCP authentication option AO, and the third flag bit is used to indicate whether the PCE supports Transport Layer Security TLS; optionally, the transmission capability information of the PCE further includes a fourth flag bit, where the fourth flag bit is used to indicate whether the PCE supports the TLS and the TCP AO;

generating a BGP route advertisement message according to the at least one IGP route advertisement message, where the BGP route advertisement message includes the location information and the transmission capability information of the PCE in the at least one IGP route advertisement message; and sending the BGP route advertisement message to an AS domain other than the AS.

Assuming that the at least one IGP route advertisement message comes from a first AS, and the BGP router is located on a border between the first AS and a second AS, the BGP route advertisement message is sent to the second AS to advertise a transmission capability of the PCE to a member within the second AS.

The communications device 1200 may be a BGP speaker.

The IGP route advertisement message is an OSPF LSA or an IS-IS LSA.

The BGP router may be a BGP speaker.

By extending a PCE-CAP-FLAGS sub-TLV of a PCED TLV in the OSPF protocol or of a PCED sub-TLV in the IS-IS protocol, the transmission capability information of the PCE may be used to define three currently unused flag bits in the PCE-CAP-FLAGS sub-TLV as the foregoing first flag bit, second flag bit, and third flag bit, which are respectively used to indicate whether the PCE supports the TCP MD5 option, whether the PCE supports the TCP AO, and whether the PCE supports the TLS. Further, the fourth flag bit may be further defined and is used to indicate whether the PCE supports the TLS and the TCP AO.

A format of the PCED TLV in the OSPF protocol or the PCED sub-TLV in the IS-IS protocol may be shown in FIG. 2a. Specifically, reference may be made to the method provided in the embodiments of the present disclosure, and details are not described herein again.

In specific implementation, the BGP protocol may be extended. For example, the PCE-ADDRESS sub-TLV and the PCE-CAP-FLAGS sub-TLV are defined in an NLRI TLV and are carried in the BGP route advertisement message. Optionally, by extending a capability optional parameter in the BGP protocol, the transmission capability information of the PCE may also be used to define a currently unused capability code, where the code is used to identify a transmission capability of the PCE. For extension of the BGP protocol, reference may be made to the method shown in FIG. 3 in the present disclosure, and details are not described herein again.

Further, the IGP route advertisement message may further include port information of the PCE, where the port information includes a port type and a port number. The port type includes a PCEP over TCP port, and a PCEP over TLS port; or the port type includes: a PCEP over TCP MD5 option port, a PCEP over TCP AO port, and a PCEP over TLS port, and further, may further include a PCEP over TLS and TCP AO port. In specific implementation, the PCED TLV in the OSPF protocol or the PCED sub-TLV in the IS-IS protocol may be extended, a sub-TLV that carries the port information of the PCE is defined, and a format may be shown in FIG. 2b. Specifically, reference may be made to the method shown in FIG. 1 in the present disclosure, and details are not described herein again.

Accordingly, the BGP route advertisement message may further include the port information of the PCE. In specific implementation, the BGP protocol may be extended. For example, the sub-TLV that carries the port information of the PCE is defined in NLRI, and a format may be shown in FIG. 2b. Being similar to extension of the OSPF protocol or the IS-IS protocol, the port information of the PCE may also be carried in two implementation manners:

In one manner, two sub-TLVs are defined to carry the port information of the PCE, where one sub-TLV carries a PCEP over TCP port, and the other sub-TLV carries a PCEP over TLS port. A PCE that supports the TCP MD5 option and a PCE that supports the TCP AO share the sub-TLV that carries the PCEP over TCP port, and a PCE that supports the TLS uses the sub-TLV of the PCEP over TLS port. Optionally, if the transmission capability information of the PCE further includes the fourth flag bit, a PCE that supports the TLS and a PCE that supports the TLS and the TCP AO share the sub-TLV of the PCEP over TLS port.

In the other manner, three sub-TLVs are defined to respectively carry a PCEP over TCP MD5 option port, a PCEP over TCP AO port, and a PCEP over TLS port. Further, if the transmission capability information of the PCE further includes the fourth flag bit, a sub-TLV may be further defined to carry a PCEP over TLS and TCP AO port.

Optionally, after the at least one IGP route advertisement message is received and before the BGP route advertisement message is generated, the method further includes: checking whether the at least one IGP route advertisement message includes the transmission capability information of the PCE; and if it is determined that the at least one IGP route advertisement message includes the transmission capability information of the PCE, generating the BGP route advertisement message; or if it is determined that the at least one IGP route advertisement message does not include the transmission capability information of the PCE, performing processing according to the current standard specification.

In this embodiment of the present disclosure, the communications device may generate a BGP route advertisement message according to only one IGP route advertisement message, or may generate a BGP route advertisement message according to multiple IGP route advertisement messages received from an AS domain, and send, to another AS domain by using the BGP route advertisement message, location information and transmission capability information of all PCEs carried in the multiple IGP route advertisement messages. For example, it is assumed that the communications device receives two IGP route advertisement messages: a first IGP route advertisement message and a second IGP route advertisement message, where the first IGP route advertisement message includes location information and transmission capability information of a first PCE, the second route advertisement message includes location information and transmission capability information of a second PCE, and the first IGP route advertisement message and the second IGP route advertisement message come from an AS domain. The communications device generates the BGP route advertisement message according to the first route advertisement message and the second route advertisement message, where the BGP route advertisement message includes the location information and the transmission capability information of the first PCE and the location information and the transmission capability information of the second PCE.

It may be understood that the IGP route advertisement message may include location information and transmission capability information of only one PCE, or may include location information and transmission capability information of multiple PCEs. Accordingly, the BGP route advertisement message includes the location information and the transmission capability information of the multiple PCEs in the IGP route advertisement message.

The communications device provided in this embodiment of the present disclosure implements advertisement of a PCE transmission capability between ASs by using an extended BGP protocol, which can ensure that a PCEP session is effectively established between a PCC and a PCE in inter-ASs, and can improve efficiency and a success rate of path computation between the PCC and the PCE.

Figure 13:
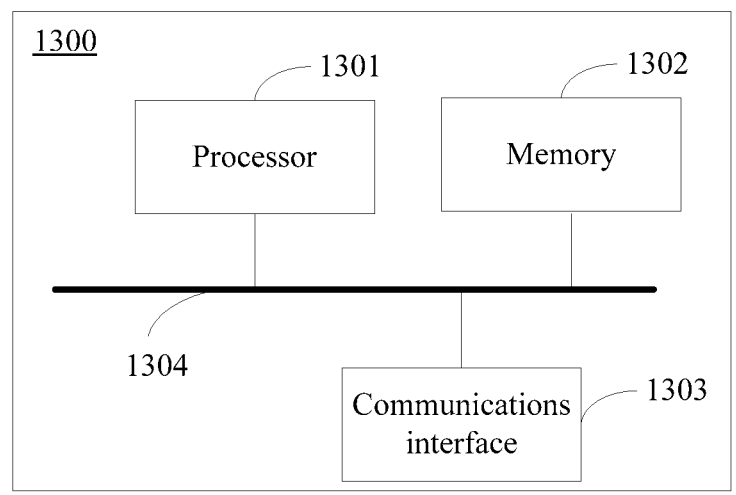
FIG. 13 is a schematic structural diagram of still another communications device according to an embodiment of the present disclosure.

As shown in FIG. 13, FIG. 13 is a schematic structural diagram of still another communications device 1300 according to an embodiment of the present disclosure. The communications device in this embodiment is an IGP router and is configured to implement the method shown in FIG. 1 in the present disclosure. The communications device 1300 includes: a processor 1301, a memory 1302, a communications interface 1303, and a bus 1304.

The processor 1301, the memory 1302, and the communications interface 1303 are connected to each other by using the bus 1304, and the bus 1304 may be a PCI bus, an EISA bus, or the like. The bus may be classified into an address bus, a data bus, a control bus, and the like. For convenience of representation, the bus is represented by using only one thick line in FIG. 13; however, it does not indicate that there is only one bus or only one type of bus.

The communications interface 1303 is configured to communicate with another communications device.

The memory 1302 is configured to store a program. The program may include program code, where the program code includes a computer operation instruction. The memory 1302 may include a high speed RAM, or may include a non-volatile memory, for example, at least one magnetic disk memory.

The processor 1301 executes the program stored by the memory 1302 and executes a method for advertising a transmission capability according to this embodiment of the present disclosure, where the method includes:

generating an IGP route advertisement message, where the route advertisement message includes location information and transmission capability information of a first PCE, and the transmission capability information of the first PCE includes a first flag bit, a second flag bit, and a third flag bit, where the first flag bit is used to indicate whether the first PCE supports a Transmission Control Protocol TCP message-digest algorithm 5 MD5 option, the second flag bit is used to indicate whether the first PCE supports a TCP authentication option AO, and the third flag bit is used to indicate whether the first PCE supports Transport Layer Security TLS; optionally, the transmission capability information of the first PCE further includes a fourth flag bit, where the fourth flag bit is used to indicate whether the first PCE supports the TLS and the TCP AO; and sending the IGP route advertisement message to an area in which the communications device 1300 is located, to advertise a transmission capability of the first PCE to a member within the area in which the communications device is located.

Generally, it may also mean that the IGP route advertisement message is flooded.

Further, the route advertisement message may further include port information of the first PCE, where the port information includes a port type and a port number. The port type includes a PCEP over TCP port, and a PCEP over TLS port; or the port type includes a PCEP over TCP MD5 option port, a PCEP over TCP AO port, and a PCEP over TLS port. Further, optionally, if the transmission capability information of the first PCE further includes the fourth flag bit, accordingly, the port type includes a PCEP over TLS and TCP AO port.

IGP includes OSPF and IS-IS. Accordingly, the communications device is an OSPF router, the area in which the communications device is located is an OSPF area, and the route advertisement message is an OSPF LSA; or the communications device is an IS-IS router, the area in which the communications device is located is an IS-IS area, and the route advertisement message is an IS-IS LSA.

In specific implementation, the location information of the first PCE, such as an IPv4 address or an IPv6 address, may be carried in a PCE-ADDRESS sub-TLV of a PCED TLV in the OSPF protocol or of a PCED sub-TLV in the IS-IS protocol. By extending the PCED TLV in the OSPF protocol or the PCED sub-TLV in the IS-IS protocol, three currently unused flag bits are defined in a PCE-CAP-FLAGS sub-TLV as the foregoing first flag bit, second flag bit, and third flag bit, which are respectively used to indicate whether the first PCE supports the TCP MD5 option, whether the first PCE supports the TCP AO, and whether the first PCE supports the TLS. Further, the fourth flag bit may be further defined and is used to indicate whether the first PCE supports the TLS and the TCP AO. A format of the PCED TLV in the OSPF protocol or the PCED sub-TLV in the IS-IS protocol may be shown in FIG. 2a. A correspondence between four extended flag bits in the PCE-ADDRESS sub-TLV in FIG. 2a and PCE capability descriptions may be as follows:

| Flag Bit (bits) | Capability Description (capability description) |
|---|---|
| 12 | Indicating whether to support a TCP MD5 (PCEP over TCP MD5) |
| 13 | Indicating whether to support a TCP AO (PCEP over TCP AO) |
| 14 | Indicating whether to support TLS (PCEP over TLS) |
| 15 | Indicating whether to support TLS and a TCP AO (PCEP over TLS and TCP AO) |

It should be noted that in FIG. 2a, defining of the four flag bits, namely, 12, 13, 14, and 15 is used as an example, and the foregoing flag bits and the corresponding capability descriptions are also used merely as an example, and constitute no limitation to the present disclosure.

Further, the PCED TLV in the OSPF protocol or the PCED sub-TLV in the IS-IS protocol may be further extended, a sub-TLV that carries the port information of the first PCE is defined, and a format may be shown in FIG. 2b. The port information of the first PCE may be carried in two implementation manners:

In one manner, two sub-TLVs are defined to carry the port information of the PCE, where one sub-TLV carries a PCEP over TCP port, and the other sub-TLV carries a PCEP over TLS port. A PCE that supports the TCP MD5 option and a PCE that supports the TCP AO share the sub-TLV that carries the PCEP over TCP port, and a PCE that supports the TLS uses the sub-TLV of the PCEP over TLS port. Optionally, if the transmission capability information of the first PCE further includes the fourth flag bit, a PCE that supports the TLS and a PCE that supports the TLS and the TCP AO share the sub-TLV of the PCEP over TLS port.

In the other manner, three sub-TLVs are defined to respectively carry a PCEP over TCP MD5 option port, a PCEP over TCP AO port, and a PCEP over TLS port. Further, if the transmission capability information of the first PCE further includes the fourth flag bit, a sub-TLV may be further defined to carry a PCEP over TLS and TCP AO port.

Further, before the route advertisement message is generated, the method may further include: receiving registration information of the first PCE, where the registration information includes the transmission capability of the first PCE.

The registration information may further include a path computation scope, a neighbor PCE, a communication capability, a path computation capability, and the like of the first PCE. Optionally, the memory 1302 is further configured to save the registration information of the first PCE.

Further, the route advertisement message may further include location information and transmission capability information of a second PCE, and optionally, further includes port information of the second PCE. Accordingly, the processor 1301 is further configured to receive registration information of the second PCE before the route advertisement message is generated, where the registration information includes a transmission capability of the second PCE.

According to the communications device provided in this embodiment of the present disclosure, a PCED TLV in the OSPF protocol or a PCED sub-TLV in the IS-IS protocol is extended, and a flag bit is defined to indicate a transmission capability of a PCE, so that advertisement of the transmission capability of the PCE can be implemented, and a PCC can select a PCE that matches a transmission capability of the PCC, which ensures that a PCEP session is effectively established between the PCC and the PCE, and improves efficiency and a success rate of path computation between the PCC and the PCE.

A person of ordinary skill in the art may be further aware that, in combination with the examples described in the embodiments disclosed in this specification, units and steps may be implemented by computer software, and the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that such implementation goes beyond the scope of the present disclosure.

Steps of methods or algorithms described in the embodiments disclosed in this specification may be implemented by hardware, or a software module executed by a processor. The software module may be configured in a random access memory (RAM), a read-only memory (ROM), an electrically programmable ROM, an electrically erasable programmable ROM, a register, a hard disk, a removable disk, or a storage medium in any other form well-known in the art.

The objectives, technical solutions, and benefits of the present disclosure are further described in detail in the foregoing specific embodiments. It should be understood that the foregoing descriptions are merely specific implementation manners of the present disclosure, but are not intended to limit the protection scope of the present disclosure. Any modification, equivalent replacement, or improvement made on the basis of the technical solutions of the present disclosure shall fall within the protection scope of the present disclosure.

What is claimed is:

1. A method for determining a path computation element, the method comprising:
   receiving, by a path computation client (PCC), one or more route advertisement messages,
      wherein the one or more route advertisement messages comprises transmission capability information of multiple path computation elements (PCEs), and
      wherein for each PCE of the multiple PCEs, the transmission capability information of the PCE comprises:
         a first flag bit indicating whether the PCE supports a transmission control protocol (TCP) authentication option (AO), and
         a second flag bit indicating whether the PCE supports transport layer security (TLS); and
   in response to the PCC supporting the TLS and the TCP AO, selecting, by the PCC, according to the first flag bit and the second flag bit in the transmission capability information of the multiple PCEs and a security requirement, a PCE which has a transmission capability supported by the PCC from the multiple PCEs and meets the security requirement.

2. The method according to claim 1, wherein the security requirement includes at least one of the TLS and sensitive data security.

3. The method according to claim 2, wherein selecting the PCE which has the transmission capability comprises: in response to the security requirement including the TLC, selecting a PCE that supports the TCP AO.

4. The method according to claim 2, wherein selecting the PCE which has the transmission capability comprises: in response to the security requirement including the sensitive data security, selecting a PCE that supports the TLS.

5. The method according to claim 2, wherein selecting the PCE which has the transmission capability comprises: in response to the security requirement including the TLS and the sensitive data security, selecting a PCE that supports the TLS and the TCP AO.

6. The method according to claim 1, wherein the one or more route advertisement messages further comprise port information of the multiple PCEs, the port information including a port type and a port number, wherein the port type comprises a PCE communication protocol (PCEP) over TCP AO port, and a PCEP over TLS port.

7. The method according to claim 1, wherein the one or more route advertisement messages further comprise port information of the multiple PCEs, the port information including a port type and a port number, wherein the port type comprises a PCE communication protocol (PCEP) over TCP port and a PCEP over TLS port.

8. The method according to claim 1, wherein selecting the PCE which has the transmission capability is performed according to the first flag bit and the second flag bit in the transmission capability information of the multiple PCEs, the security requirement and with reference to the priorities of the PCEs.

9. The method according to claim 1, wherein selecting the PCE which has the transmission capability is performed according to the first flag bit and the second flag bit in the transmission capability information of the multiple PCEs, the security requirement and with reference to load information of the multiple PCEs.

10. The method according to claim 1, wherein selecting the PCE which has the transmission capability is performed according to the first flag bit and the second flag bit in the transmission capability information of the multiple PCEs, the security requirement and with reference to the preference of the PCC.

11. The method according to claim 1, wherein the one or more route advertisement messages comprise an interior gateway protocol (IGP) route advertisement message, and/or a border gateway protocol (BGP) route advertisement message.

12. A communications device, said device being a path computation client (PCC), comprising:
a communications interface and a processor;
the communications interface is configured to cooperate with the processor to receive one or more route advertisement messages,
wherein the one or more route advertisement messages comprise transmission capability information of multiple path computation elements (PCEs), and
wherein for each PCE of the multiple PCEs, the transmission capability information of the PCE comprises:
a first flag bit indicating whether the PCE supports a transmission control protocol (TCP) authentication option (AO), and
a second flag bit indicating whether the PCE supports transport layer security (TLS);
in response to the PCC supporting the TLS and the TCP AO, the processor is configured to select, according to the first flag bit and the second flag bit in the transmission capability information of the multiple PCEs and a security requirement, a PCE which has a transmission capability supported by the PCC and meets the security requirement.

13. The communications device according to claim 12, wherein the security requirement includes at least one of the TLS and sensitive data security.

14. The communications device according to claim 13, wherein the processor is further configured to select a PCE that supports the TCP AO when the security requirement includes the TLS.

15. The communications device according to claim 13, wherein the processor is further configured to select a PCE that supports the TLS when the security requirement includes the sensitive data security.

16. The communications device according to claim 13, wherein the processor is further configured to select a PCE that supports the TLS and the TCP AO when the security requirement includes the TLS and the sensitive data security.

17. The communications device according to claim 12, wherein the one or more route advertisement messages comprise an interior gateway protocol (IGP) route advertisement message, and/or a border gateway protocol (BGP) route advertisement message.

18. A non-transitory computer readable medium containing computer-executable instructions, the computer-executable instructions, when executed by a processor of a path computation client (PCC), causing the PCC to perform operations comprising:
receiving one or more route advertisement messages,
wherein the one or more route advertisement messages comprise transmission capability information of multiple path computation elements (PCEs), and
wherein for each PCE of the multiple PCEs, the transmission capability information of the PCE comprises:
a first flag bit indicating whether the PCE supports a transmission control protocol (TCP) authentication option (AO), and
a second flag bit indicating whether the PCE supports transport layer security (TLS); and
in response to the PCC supporting the TLS and the TCP AO, selecting, according to the first flag bit and the second flag bit in the transmission capability information of the multiple PCEs and a security requirement, a PCE which has a transmission capability supported by the PCC and meets the security requirement.

19. The non-transitory computer readable medium according to claim 18, wherein the one or more route advertisement messages further comprise port information of the multiple PCEs, the port information including a port type and a port number, wherein the port type comprises a PCE communication protocol (PCEP) over TCP AO port, and a PCEP over TLS port.

20. The non-transitory computer readable medium according to claim 18, wherein the one or more route advertisement messages further comprise port information of the multiple PCEs, the port information including a port type and a port number, wherein the port type comprises a PCE communication protocol (PCEP) over TCP port and a PCEP over TLS port.

* * * * *